(12) United States Patent
Nakamura et al.

(10) Patent No.: US 8,648,893 B2
(45) Date of Patent: *Feb. 11, 2014

(54) ELECTROOPTIC DEVICE

(75) Inventors: Kouichirou Nakamura, Atsugi (JP);
Kazuo Fujiura, Atsugi (JP); Tadayuki Imai, Atsugi (JP); Jun Miyazu, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 171 days.

This patent is subject to a terminal disclaimer.

(21) Appl. No.: 12/816,801

(22) Filed: Jun. 16, 2010

(65) Prior Publication Data

US 2010/0253996 A1    Oct. 7, 2010

Related U.S. Application Data

(62) Division of application No. 11/916,744, filed as application No. PCT/JP2006/312342 on Jun. 20, 2006, now Pat. No. 7,764,302.

(30) Foreign Application Priority Data

| Jun. 20, 2005 | (JP) | 2005-179306 |
| Feb. 28, 2006 | (JP) | 2006-053306 |
| Mar. 30, 2006 | (JP) | 2006-094999 |
| Mar. 31, 2006 | (JP) | 2006-100403 |
| Mar. 31, 2006 | (JP) | 2006-100404 |
| May 17, 2006 | (JP) | 2006-138323 |
| May 17, 2006 | (JP) | 2006-138324 |

(51) Int. Cl.
*B41J 2/47* (2006.01)

(52) U.S. Cl.
USPC .................................. 347/239; 347/255

(58) Field of Classification Search
USPC .......... 347/239, 243, 255, 259, 260; 349/1, 2, 349/16, 62, 182–186
See application file for complete search history.

(56) References Cited

U.S. PATENT DOCUMENTS 3,242,805 A * 3/1966 Harrick ......................... 359/261
3,458,247 A    7/1969 Buhrer et al.
(Continued)

FOREIGN PATENT DOCUMENTS

GB          1253004 A       11/1971
JP          59-219726       12/1984
(Continued)

OTHER PUBLICATIONS

B.V. Bokut et al., *Space Charge in Anisotropic Conducting Media and its Electrical Detection*, Technical Physics, vol. 39, No. 6, Jun. 1994, pp. 584-586.

(Continued)

*Primary Examiner* — Hai C Pham
(74) *Attorney, Agent, or Firm* — Workman Nydegger

(57) ABSTRACT

An electrooptic device having a simple structure that can efficiently increase deflection of a beam is provided. The device includes: an electrooptic crystal (11) having an electrooptic effect; an electrode pair of a positive electrode (12) and a negative electrode (13) for generating an electric field inside the electrooptic crystal; and a power source for applying a voltage between the electrode pair so as to generate a space charge inside the electrooptic crystal. With this arrangement, by using a simple structure, a change in a deflection angle is temporally rapid, and a large deflection angle that cannot be obtained by a conventional electrooptic crystal prism can be acquired at a low applied voltage.

5 Claims, 33 Drawing Sheets

(56) References Cited

U.S. PATENT DOCUMENTS

| | | | |
|---|---|---|---|
| 3,506,834 A | | 4/1970 | Buschbaum et al. |
| 3,531,183 A | * | 9/1970 | Aagard .................. 359/317 |
| 3,614,191 A | * | 10/1971 | Sakaguchi et al. .............. 359/11 |
| 3,862,431 A | * | 1/1975 | Quate et al. .................. 307/424 |
| 3,923,380 A | * | 12/1975 | Hattori et al. ................. 359/260 |
| 3,938,878 A | | 2/1976 | Fox |
| 4,124,273 A | | 11/1978 | Huignard et al. |
| 4,466,703 A | * | 8/1984 | Nishimoto .................... 359/319 |
| 4,773,739 A | | 9/1988 | Valley et al. |
| 4,804,251 A | | 2/1989 | Jacobs |
| 5,020,885 A | | 6/1991 | Shibaguchi |
| 5,064,277 A | * | 11/1991 | Blazey et al. ................. 359/276 |
| 5,696,622 A | | 12/1997 | Sumi |
| 5,734,491 A | | 3/1998 | Debesis |
| 6,025,864 A | | 2/2000 | Nashimoto |
| 6,078,717 A | | 6/2000 | Nashimoto et al. |
| 6,449,084 B1 | | 9/2002 | Guo |
| 6,707,514 B2 | | 3/2004 | Kondoh et al. |
| 7,764,302 B2 | * | 7/2010 | Nakamura et al. ............ 347/239 |
| 2004/0052456 A1 | * | 3/2004 | Boffi et al. ....................... 385/31 |
| 2006/0051041 A1 | | 3/2006 | Imai et al. |

FOREIGN PATENT DOCUMENTS

| | | |
|---|---|---|
| JP | 61-275722 | 12/1986 |
| JP | 62-079418 | 4/1987 |
| JP | 63-216032 | 9/1988 |
| JP | 01-284827 | 11/1989 |
| JP | H05-129881 | 6/1993 |
| JP | 09-159950 | 6/1997 |
| JP | 10-239717 | 9/1998 |
| JP | 10-288798 | 10/1998 |
| JP | 11-202271 | 7/1999 |
| JP | 2000-056344 | 2/2000 |
| JP | 2000-068063 | 3/2000 |
| JP | 2000-069063 | 3/2000 |
| JP | 2003-035831 | 2/2003 |
| JP | 2004-004194 | 1/2004 |
| JP | 2004004194 A * | 1/2004 |
| JP | 43-028891 | 12/2012 |
| WO | 01/40849 | 6/2001 |
| WO | 03/046897 | 6/2003 |
| WO | 2004-083853 | 9/2004 |
| WO | 2004/083953 | 9/2004 |
| WO | 2005/008304 | 1/2005 |

OTHER PUBLICATIONS

L. Tian et al., *Anomalous Electro-optic in $Sr_{0.6}Ba_{0.4}Nb_2O_6$ Single Crystals and its Application in Two-Dimensional Laser Scanning*, Applied Physics Letters, vol. 83, No. 21, Nov. 24, 2003, pp. 4375-4377.
Sugama et al., *Electro-optic Beam-deflection Optical Switch*, Technical Report of IEICI, PN2004-59 (Oct. 2004), p. 62.
Itoh et al., *High-frequency response of electro-optic single crystal $KTa_xNb_{1-x}O_3$ in paraelectric phase*, 2005 Quantum Electronics and Laser Science Conference (QELS) held on May 22-27, 2005, vol. 2, pp. 885-887, JTuC36.
Chen et al., *Light Modulation and Beam Deflection with Potassium Tantalate-Niobate Crystals*, Journal of Applied Physics, vol. 37, No. 1, Jan. 1966, pp. 388-398.
Supplementary European Search Report dated Jun. 24, 2009 from corresponding European Patent Application No. 06767001.8 (13 pages).
Korean Office Action dated Mar. 8, 2010, from related Korean Application No. 10-2009-7025594.
A.J. Campbell et al., *Space-charge Limited Conduction with Traps in Poly(phenylene vinylene) Light Emitting Diodes*, J. Appl. Phys., vol. 82, No. 12, Dec. 15, 1997, pp. 6326-6342.
International Preliminary Report on Patentability dated Jan. 10, 2008 for the related PCT Application No. PCT/JP2006/312342.
U.S. Appl. No. 11/916,744, Oct. 14, 2009, Office Action.
U.S. Appl. No. 11/916,744, Apr. 12, 2010, Notice of Allowance.
European Search Report issued on Jul. 23, 2010 in related European Patent Application No. 10165234.5.
Japanese Office Action issued on Apr. 27, 2012 in related Japanese Patent Application No. 2011-057231.
U.S. Appl. No. 13/428,118, Oct. 9, 2012, Office Action.
Final Office Action dated Feb. 1, 2013 in related U.S. Appl. No. 13/428,118.
Office Action dated Mar. 26, 2013 in related Japanese Application No. 2001-057231 w/English translation.
Kazuo Fujiura et al., *High-Efficiency Electro-Optic Phase Modulator with KTN Crystal Waveguides*, The Institute of Electronics, Information and Communication Engineers, vol. 103, No. 616, Jan. 2004, pp. 25-30.

* cited by examiner

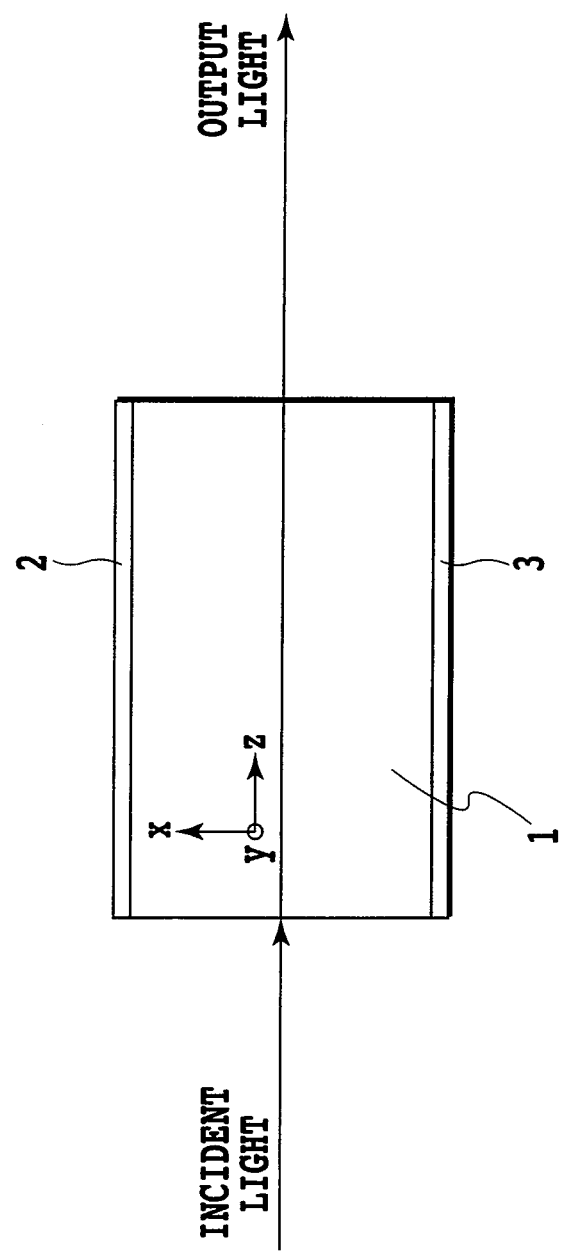

ELECTROOPTIC DEVICE

CROSS-REFERENCE TO RELATED APPLICATIONS

This application is a divisional of U.S. patent application Ser. No. 11/916,744, filed Dec. 6, 2007, which is a US nationalization of PCT Application No. PCT/JP2006/312342, filed Jun. 20, 2006, which claims priority to Japanese Patent Application Nos. 2005-179306, filed Jun. 20, 2005; 2006-053306, filed Feb. 28, 2006; 2006-094999, filed Mar. 30, 2006; 2006-100403, filed Mar. 31, 2006; 2006-100404, filed Mar. 31, 2006; 2006-138323, filed May 17, 2006; and 2006-138324, filed May 17, 2006, which are incorporated herein by reference.

BACKGROUND OF THE INVENTION

1. The Field of the Invention

The present invention relates to an electrooptic device, and more particularly relates to an electrooptic device that changes the refractive index of an electrooptic crystal by controlling the electric field of the crystal, so that the forwarding direction of light can be changed, or the phase of light can be changed.

2. The Relevant Technology

At present, requests for an optical control device that deflects a laser beam have increased for video apparatuses, such as projectors, laser printers, confocal microscopes having a high resolution, barcode readers, etc. As optical deflection techniques, a technique for rotating a polygon mirror, a technique for employing a galvano mirror to control the deflected direction of light, a diffraction technique that employs the acousto-optic effect, and a micro machine technique called the MEMS (Micro Electro Mechanical System) have been proposed.

As for a polygon mirror, a mirror having the shape of a polyhedron is mechanically rotated, and the reflection direction of a laser beam is sequentially changed to deflect light. Since a method employing a polygon mirror utilizes mechanical rotations, the rotational speed is limited. That is, the acquisition of revolutions equal to or greater than 10000 rpm is difficult for a polygon mirror, and there is a fault in that a polygon mirror is not appropriate for an application required for a rapid operation. A method employing a polygon mirror has been utilized for the deflection of the laser beam of a laser printer. However, the limit imposed by the rotational speed of a polygon mirror is a bottleneck when it comes to increasing the printing speed of a printer. In order to further increase the printing speed of a printer, a faster optical deflection technique is required.

A galvano mirror is employed for a laser scanner, etc., that deflects and scans a laser beam. A conventional practical galvano mirror has, for example, a magnetic path formed by a moving iron core, which is used instead of a moving coil arranged in a magnetic field, and a magnetic member, around which two permanent magnets and four magnetic poles are arranged.

When the magnetic fluxes between the magnetic poles are changed by the magnitude and the direction of a current that flows across a drive coil that is wound around the magnetic member, a reflecting mirror is moved via the moving iron core and the laser beam is deflected and scanned. The method employing a galvano mirror can perform a rapid operation. However, since the drive coil of a conventional galvano mirror is provided by a machine winding, downsizing is difficult. Therefore, it is difficult for the sizes of a laser scanning system employing a galvano mirror and a laser application apparatus that employs this system to be further reduced. Furthermore, there is a fault that power consumption is large. There is another fault in that a rapid operation can not be performed within a cycle of the MHz unit.

An optical deflector of an optical diffraction type that employs the acousto-optic effect has been put to practical use. However, a method employing this optical deflector of an optical diffraction type consumes a large amount of power and downsizing is difficult. Further, there is a fault in that it is difficult to obtain a large deflection angle and to perform a rapid operation. In addition, since a method employing the MEMS electrostatically drives a fine mirror as an optical deflection device, several tens of .mu.m is the limit placed on the response.

Conventionally, various optical function parts employing an electrooptic crystal have been put to practical use. These optical function parts employ a phenomenon such that, upon the application of a voltage to an electrooptic crystal, the refractive index of the crystal is changed by the electrooptic effect. Thus, as means for solving the above described problems, a technique has been developed whereby a voltage is applied to the electrodes of an electrooptic crystal, and a beam is deflected by the electrooptic effect (see, for example, patent document 1). Furthermore, a technique has been developed whereby a beam is deflected using an electrooptic crystal that is processed in a prism shape, or an electrooptic crystal wherein electrodes having a prism shape are formed (see, for example, patent document 2). When a voltage is applied to the electrodes of the electrooptic crystal, the refractive index can be changed because of the electrooptic effect. By using the method that employs electrodes shaped like a prism, an area where the refractive index is changed and an area where a voltage is not applied, and a refractive index is not changed, are produced in the electrooptic crystal. Due to a refractive index difference at the boundary of the two areas, a beam is deflected, and a deflection angle is obtained.

By using the method employing the electrooptic crystal, a response up to the speed limit of the electrooptic effect is available, and a response exceeding one GHz can be obtained.

In the past, reports of using $LiNbO_3$ (hereinafter referred to as an LN crystal) and PLZT were submitted as optical deflection devices employing an electrooptic crystal. However, since a device employing the LN crystal produces only a small electrooptic effect, there is a fault in that only a deflection angle of about 3 mrad is obtained by applying a voltage of about 5 kV/mm. Further, also for a device using PLZT, a deflection angle of about 45 mrad is the limit, relative to the application of an electric field of 20 kV/mm (see, for example, non-patent document 1).

However, according to the conventional method, there is only a small change of the refractive index in each prism area due to the electrooptic effect, and the deflection angle due to the refractive index change is also small. Therefore, in order to obtain a large deflection angle, a plurality of prisms must be arranged for the conventional method. However, in a case wherein a plurality of prisms are arranged, there is a problem in that, when light enters the prisms at a large incident angle, a desired resolution cannot be obtained.

On the other hand, an optical phase modulator employing an electrooptic crystal changes the refractive index of the crystal to change the speed at which light passes through the crystal, and to change the phase of the light. Further, when the electrooptic crystal is located on one of the optical waveguide paths of a Mach-Zehnder interferometer and a Michelson interferometer, the light intensity of the output of the interferometer is changed in accordance with a voltage applied to the crystal. These interferometers can be employed as optical switches or optical modulators.

FIG. 1 shows the structure of a conventional optical phase modulator employing an electrooptic crystal. In the optical phase modulator, a positive electrode 2 and a negative electrode 3 are formed on opposite faces of the block of an electrooptic crystal 1. The crystal axes x, y and z of the electrooptic crystal 1 are defined as shown in FIG. 1. The change in the refractive index due to the electrooptic effect is provided by the linear Pockels effect and the quadratic Kerr effect.

In the case of the quadratic Kerr effect, $s_{11}$ is an electrooptic constant for vertically polarized light, i.e., for the polarization direction relative to the x axial direction in FIG. 1. The change in a phase when a voltage V is applied between the positive electrode 2 and the negative electrode 3 is provided by the following expression.

[Expression 1]

$$\phi_x = \frac{\pi n^3 L s_{11}}{\lambda}\left(\frac{V}{d}\right)^2 \quad (1)$$

Here, n denotes the refractive index of the electrooptic crystal 1, L denotes a light propagation direction, i.e., the length of the electrooptic crystal 1 in the z axial direction in FIG. 1, λ denotes the wavelength of light, and d denotes the interval between the positive electrode 2 and the negative electrode 3. $s_{12}$ is an electrooptic constant for horizontally polarized light, i.e., for a polarization direction relative to the y axial direction in FIG. 1, and the change in a phase when a voltage V is applied between the positive electrode 2 and the negative electrode 3 is obtained by using the following expression.

[Expression 2]

$$\phi_y = \frac{\pi n^3 L s_{12}}{\lambda}\left(\frac{V}{d}\right)^2 \quad (2)$$

A half-wave voltage is employed as an index that represents the efficiency of the optical phase modulator. A half-wave voltage is a voltage that is required to change the phase of light by π radian, and is provided by the following expression.

[Expression 3]

$$V_\pi = \sqrt{\frac{\lambda d^2}{n^3 L s_{ij}}} \quad (3)$$

Next, an explanation will be given for a light intensity modulator that is constituted by combining an optical phase modulator, a polarizer and an analyzer. FIGS. 2A and 2B show the structure of a conventional light intensity modulator. As shown in FIG. 2A, a positive electrode 2 and a negative electrode 3 are formed on opposite faces of an electrooptic crystal 1. A polarizer 4 is located on the incidence side of the electrooptic crystal 1, and an analyzer 5 is located on the emittance side. Of the field elements of light that is passed through the polarizer 4, the element parallel to the x axis is defined as Ex, and the element parallel to the y axis is defined as Ey. In a case wherein the polarization angle of the polarizer 4 is 45 degrees relative to the x axis of the electrooptic crystal 1, Ex=Ey.

The changes in the phases of Ex and Ey upon the application of a voltage V between the positive electrode 2 and the negative electrode 3 are respectively obtained by expressions (1) and (2). In a case wherein the polarization angle of the analyzer 5 is 45 degrees relative to the x axis of the electrooptic crystal 1, the intensity of the output light that is passed through the analyzer 5 is provided by the following expression.

[Expression 4]

$$I = \left|\frac{E_x}{\sqrt{2}}e^{j\phi_x} + \frac{E_y}{\sqrt{2}}e^{j\phi_{yx}}\right|^2 \quad (4)$$

$$= \frac{E_x^2}{2} + \frac{E_y^2}{2} + E_x E_y \cos(\phi_x - \phi_y)$$

$$= \frac{E_x^2}{2} + \frac{E_y^2}{2} + E_x E_y \cos\left\{\frac{\pi n^3 L}{\lambda}(s_{11} - s_{12})\left(\frac{V}{d}\right)^2\right\}$$

In a case wherein Ex and Ey are equal, $$E_x = E_y = \frac{E}{\sqrt{2}} \quad \text{[Expression 5]}$$

is employed, and the light intensity is provided by the following expression.

[Expression 6]

$$I = \frac{E^2}{2}\left[1 + 2\cos\left\{\frac{\pi n^3 L}{\lambda}(s_{11} - s_{12})\left(\frac{V}{d}\right)^2\right\}\right] \quad (5)$$

$$= E^2 \sin^2\left\{\frac{\pi n^3 L}{\lambda}(s_{11} - s_{12})\left(\frac{V}{d}\right)^2\right\}$$

In this manner, as shown in FIG. 2B, the intensity of the output light that is passed through the analyzer 5 can be modulated between 0% to 100%, in accordance with the voltage V. As an index that indicates the efficiency of the light intensity modulator, a semi-half voltage that changes the intensity of the output light from 0% to 100% is represented by the following expression.

[Expression 7]

$$V_x = \sqrt{\frac{\lambda d^2}{n^3 L(s_{11} - s_{12})}} \quad (6)$$

However, since the conventional electrooptic crystal has only a small electrooptic constant, in order to constitute an optical phase modulator and a light intensity modulator for practical use, a half-wave voltage of a kV order must be employed. Since a great load is imposed on a drive circuit for fast modulation of the voltage of a kV order, there is a problem in that increasing the size of an apparatus can not be avoided. Further, there is also a problem in that, when a voltage of a kV order is modulated at a high speed, high frequency noise occurs, and will enter a peripheral device.

One objective of the present invention is to provide an electrooptic device having a simple arrangement that can efficiently increase the deflection of abeam. Further, another objective of the present invention is to provide an electrooptic device having a simple arrangement that can efficiently modulate the phase of light.

Patent Document 1: Japanese Patent Laid-Open No. Hei 10-239717

Patent Document 2: Japanese Patent Laid-Open No. Hei 09-159950

Non-Patent Document 1: Akio Sugama, et al., "Development of EO waveguide Path Deflection Optical Switch", Technical Report of The Institute of Electronics, Information and Communication Engineers, PN2004-59, p. 61 to 64, published October, 2004 by the Institute of Electronics, Information and Communication Engineers Association.

Non-Patent Document 2: Toshihiro Itoh, Masahiro Sasaura, Seiji Toyoda, Katsue Manabe, Koichiro Nakamura and Kazuo Fujiura, "High-frequency response of electro-optic single crystal KTaxNb1-xO3 in paraelectric phase," in Conference on Lasers and Electro-Optics/Quantum Electronics and Laser Science and Photonic Applications, Systems and Technologies 2005 (Optical Society of America, Washington, D.C., 2005), JTuC 36

Non-Patent Document 3: P. S. Chen, et. al., "Light Modulation and Beam Deflection with Potassium Tantalate-Niobate Crystals," Journal of Applied Physics, 1966, Vol. 37, no. 1, pp. 388-398

SUMMARY OF THE INVENTION

According to an electrooptic device for the present invention, a space charge is generated inside an electrooptic crystal by applying a voltage to the electrooptic crystal, and a tilt of the electric field is produced in cross section relative to the light axis of a beam that enters. When the tilt of the electric field is controlled, beam deflection by an optical deflector can be increased. Further, when beam deflection is reduced, and the angle of shifting between vertically polarized light and horizontally polarized light is reduced, an optical phase modulator can efficiently perform optical phase modulation.

In order to achieve the above described objectives, an embodiment of the present invention is an electrooptic device that comprises an electrooptic crystal having an electrooptic effect; an electrode pair of a positive electrode and a negative electrode, for generating an electric field inside the electrooptic crystal; and a power source for applying a voltage to the electrode pair so as to generate a space charge inside the electrooptic crystal.

Another embodiment of the present invention is a beam deflector that comprises an electrooptic crystal having an electrooptic effect; and an electrode pair of a positive electrode and a negative electrode, which are formed of a material that serves as an ohmic contact relative to a carrier that contributes to electrical conduction of the electrooptic crystal, and which generate an electric field inside the electrooptic crystal.

An additional embodiment of the present invention is a light intensity modulator that comprises an electrooptic crystal having an electrooptic effect; a polarizer arranged on an incident-side light axis of the electrooptic crystal; an analyzer arranged on an emittance-side light axis of the electrooptic crystal; and an electrode pair of a positive electrode and a negative electrode, which are formed of a material that serves as a Schottky contact relative to a carrier that contributes to electrical conduction by the electrooptic crystal, and which generate an electric field inside the electrooptic crystal.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

FIG. 1 is a diagram illustrating the structure of a conventional optical phase modulator employing an electrooptic crystal;

DETAILED DESCRIPTION OF THE PREFERRED EMBODIMENTS

Figure 2A:
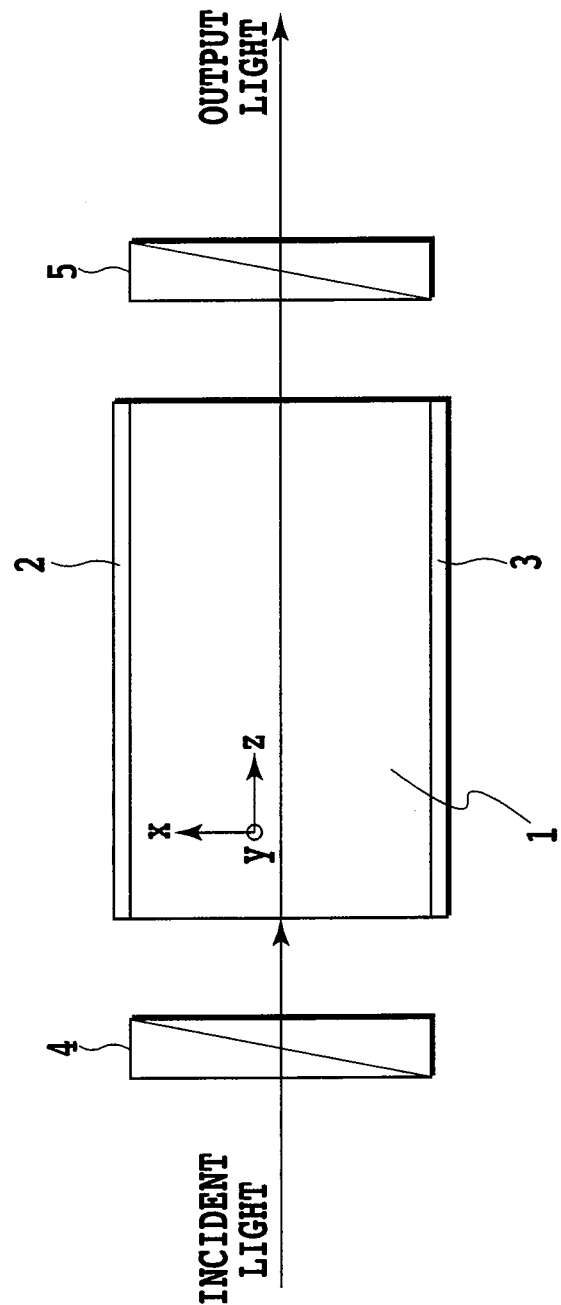
FIG. 2A is a diagram illustrating the structure of a conventional light intensity modulator.

Embodiments of the present invention will now be described in detail while referring to the drawings.
(Material for an Electrooptic Crystal)

It is preferable that an electrooptic crystal that has a large Pockels constant $r_{ij}$, which is a linear electrooptic constant, or a large Kerr constant $s_{ij}$, which is a quadratic electrooptic constant, be employed in order to efficiently increase beam deflection and efficiently perform phase modulation. Such an electrooptic crystal having a large electrooptic constant can, for example, be a KLTN crystal having a ferroelectric phase that has a large Pockels effect $r_{ij}$ or a KLTN crystal having a paraelectric phase that has a large Kerr constant $s_{ij}$. The KLTN crystal is a crystal represented as $K_{1-x}Li_yTa_{1-x}Nb_xO_3$ (0<x<1, 0<y<1).

Other electrooptic crystals having a large electrooptic constant are electrooptic crystals of $LiNbO_3$ (hereinafter referred to as LN), $LiTaO_3$, $LiIO_3$, $KNbO_3$, $KTiOPO_4$, $BaTiO_3$, $SrTiO_3$, $Ba_{1-x}Sr_xTiO_3$ (0<x<1), $Ba_{1-x}Sr_xNb_2O_6$ (0<x<1), $Sr_{0.75}Ba_{0.25}Nb_2O_6$, $Pb_{1-y}La_yTi_{1-x}Zr_xO_3$ (0<x<1, 0<y<1), $Pb(Mg_{1/3}Nb_{2/3})O_3$—$PbTiO_3$, $KH_2PO_4$, $KD_2PO_4$, $(NH_4)H_2PO_4$, $BaB_2O_4$, $LiB_3O_5$, $CsLiB_6O_{10}$, GaAs, CdTe, GaP, ZnS, ZnSe, ZnTe, CdS, CdSe and ZnO.

Figure 2B:
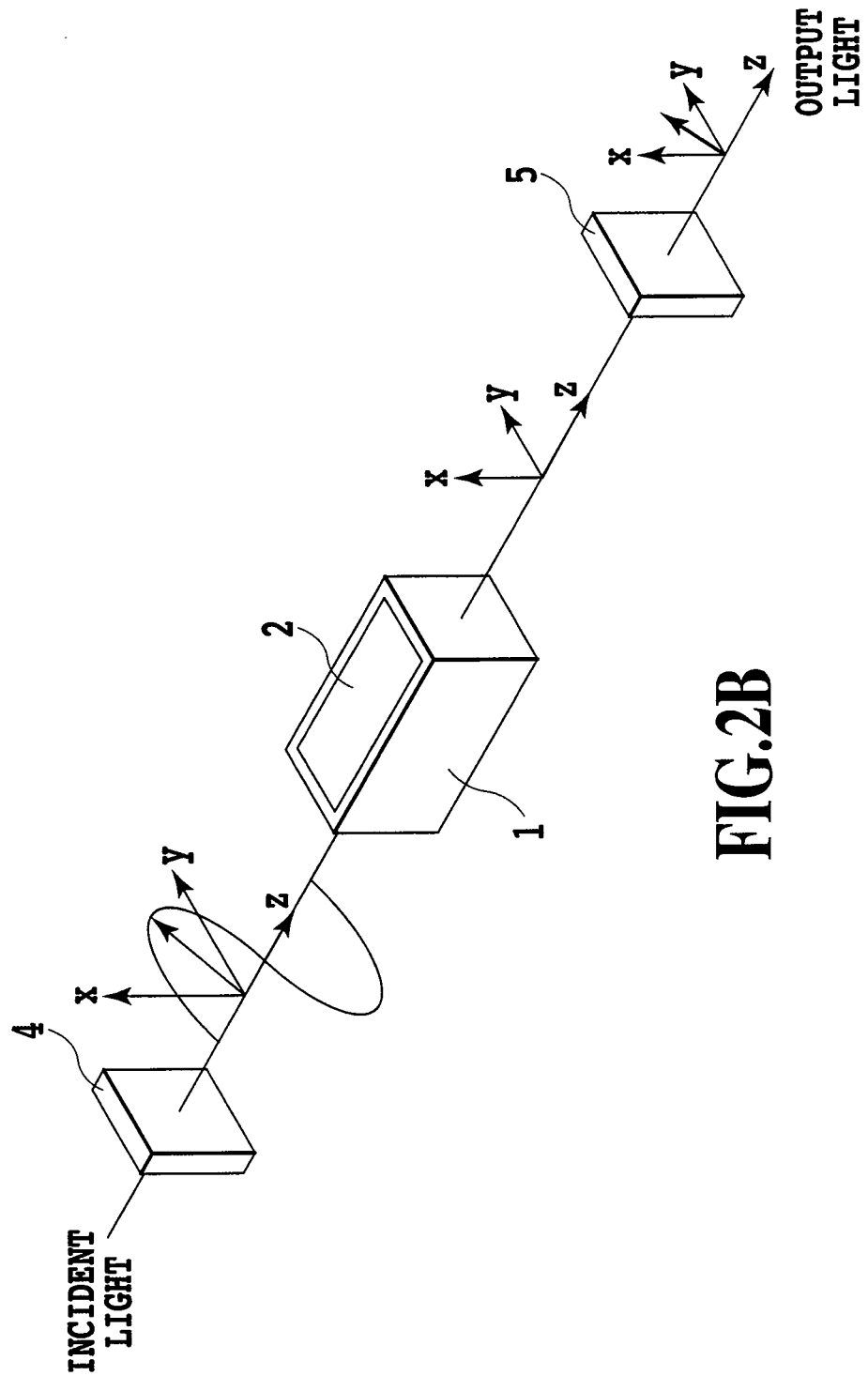
FIG. 2B is a perspective view of the structure of the conventional light intensity modulator.

An explanation will be given for a case wherein an KLTN crystal is employed for an electrooptic crystal 1 of a light intensity modulator shown in FIG. 2B. The electrooptic crystal 1, which is a KLTN crystal, is cut to obtain a size 6 mm long (z axis)×5 mm wide (y axis)×0.5 mm thick (x axis), and electrodes 5 mm long and 4 mm wide are attached to opposite faces. For the KLTN crystal, electrons are carriers that contribute to electrical conduction. Two types of electrode materials, Pt and Ti, are prepared. The KLTN crystal has an electrooptic constant that is large in the vicinity of a phase transition from a cubic system to a tetragonal system. The phase transition temperature of the KLTN temperature is 55° C., and 60° C. is set as the temperature of the electrooptic crystal 1. When a voltage of 58 V is applied between the positive and negative electrodes, the polarization direction of output light is rotated 90 degrees relative to the polarization direction of incident light.

Figure 3:
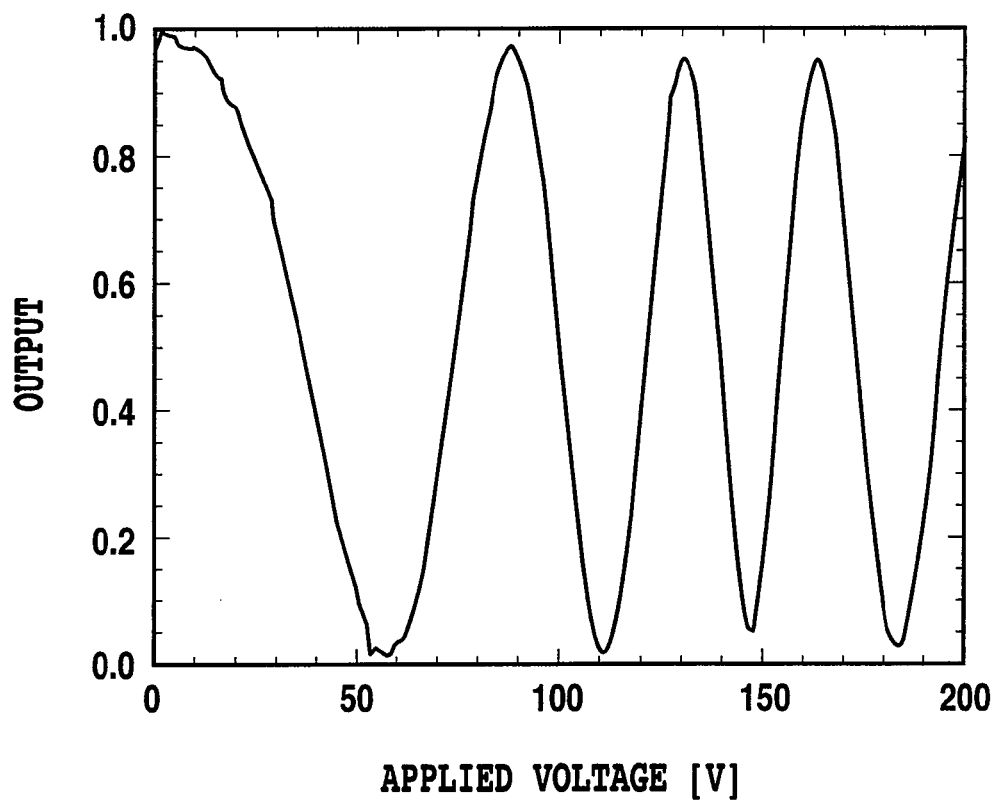
FIG. 3 is a graph showing the operational characteristics of a light intensity modulator for electrode material Pt.
Figure 4:
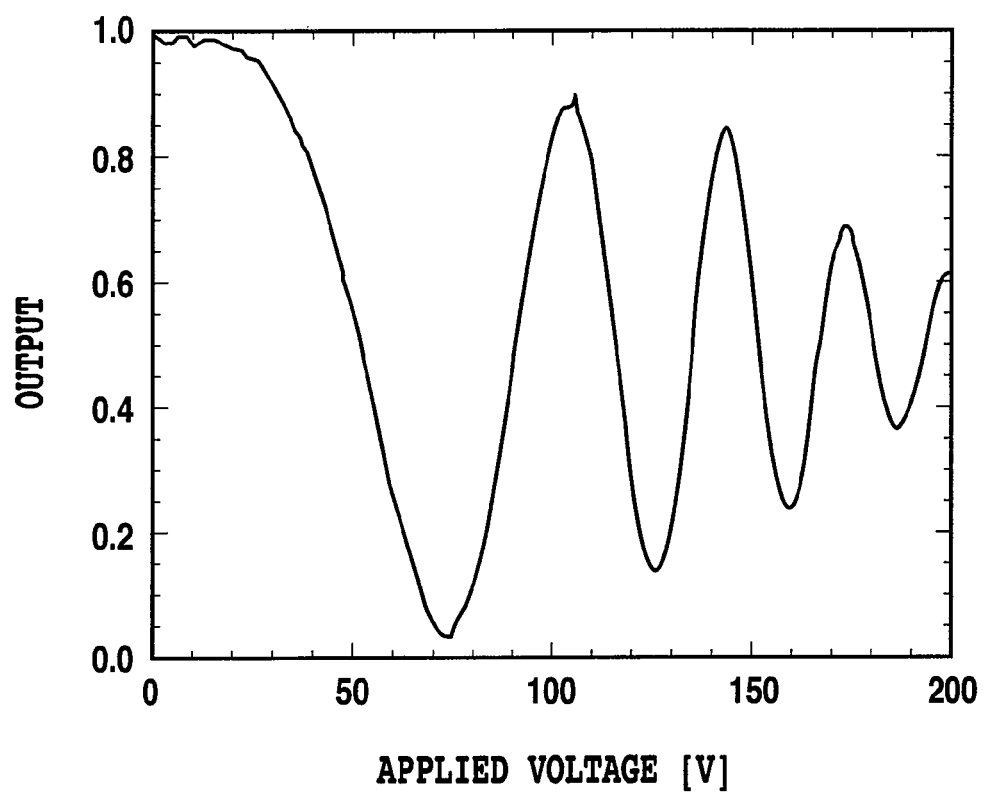
FIG. 4 is a graph showing the operational characteristics of a light intensity modulator for electrode material Ti.

FIG. 3 shows the operational characteristics of a light intensity modulator for the electrode material Pt. It is found that, as the voltage applied between a positive electrode 2 and a negative electrode 3 is increased, the output light is repetitively turned on and off, and the structure serves as an optical switch. FIG. 4 shows the operational characteristics of a light intensity modulator for the electrode material Ti.

It is apparent that as an applied voltage is increased the intensity of output light is changed, and the ratio of the light intensities at the ON/OFF time (hereinafter called an extinction ratio) is deteriorated.

Figure 5:
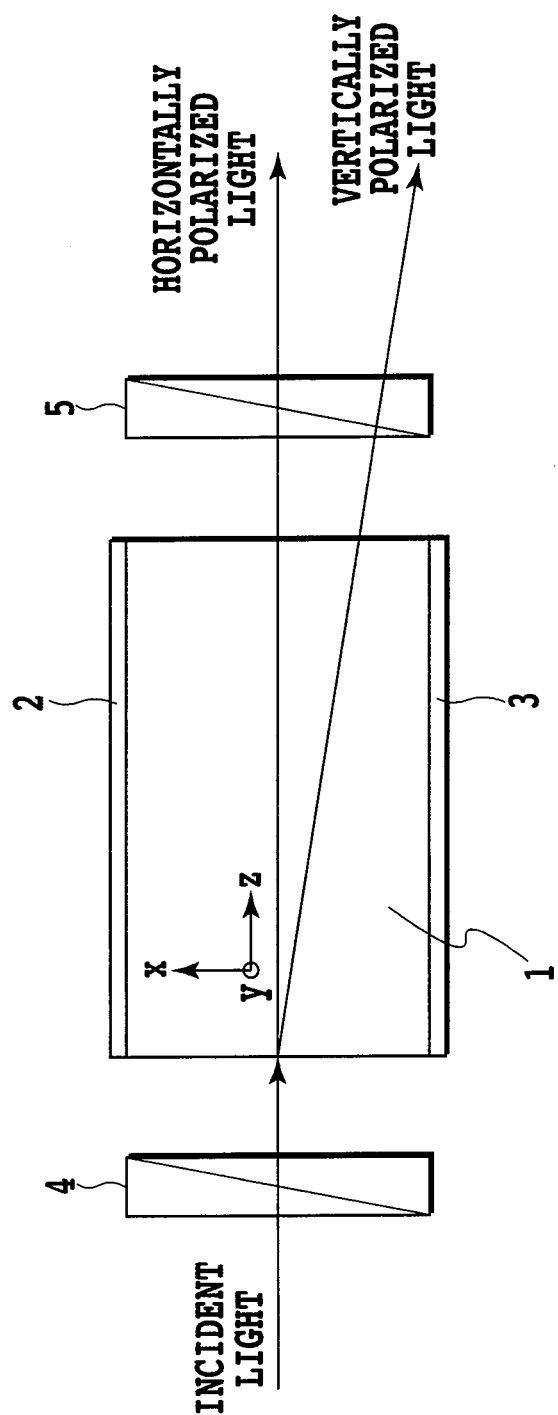
FIG. 5 is a diagram illustrating a case wherein a change in a refractive index is tilted for a light intensity modulator.

When the reason that the extinction ratio is deteriorated for the optical switch was studied, it was found that when a voltage is applied to the electrooptic crystal, a space charge is generated inside the electrooptic crystal, and the electric field is tilted in a direction in which the voltage is applied, so that the change in the refractive index is also tilted. FIG. 5 shows a case wherein the change of the refractive index of the light intensity modulator is tilted. Since the electrooptic effect depends on polarization, the change in the refractive index is tilted differently for vertically polarized light and horizontally polarized light. For the KLTN crystal, since the Kerr constant for vertically polarized light and horizontally polarized light is $s_{11}:s_{12}$=about 10:−1, only the output angle of vertically polarized light is greatly changed. Therefore, as the voltage V applied to the crystal is increased, the angle of the shifting between the vertically polarized light and horizontally polarized light becomes greater, and as shown in FIG. 4, the extinction ratio is deteriorated.
(Principle Behind Generation of a Tilt in an Electric Field)

An explanation will now be given for the principle behind the generation of a tilt in an electric field upon the application of a voltage. When a voltage is applied to an electrooptic crystal, a space charge is generated in consonance with the high-field electrical conduction of the crystal. The high-field electrical conduction is the electrical conduction in an area in a space-charge limited state wherein the relationship between a voltage and a current is outside Ohm's law, and a current is non-linearly increased relative to a voltage. In a case wherein a bulk current in the crystal is small, relative to a current injected via an electrode, in the area in the space-charge limited state, a space charge is produced in the crystal.

Figure 6A:
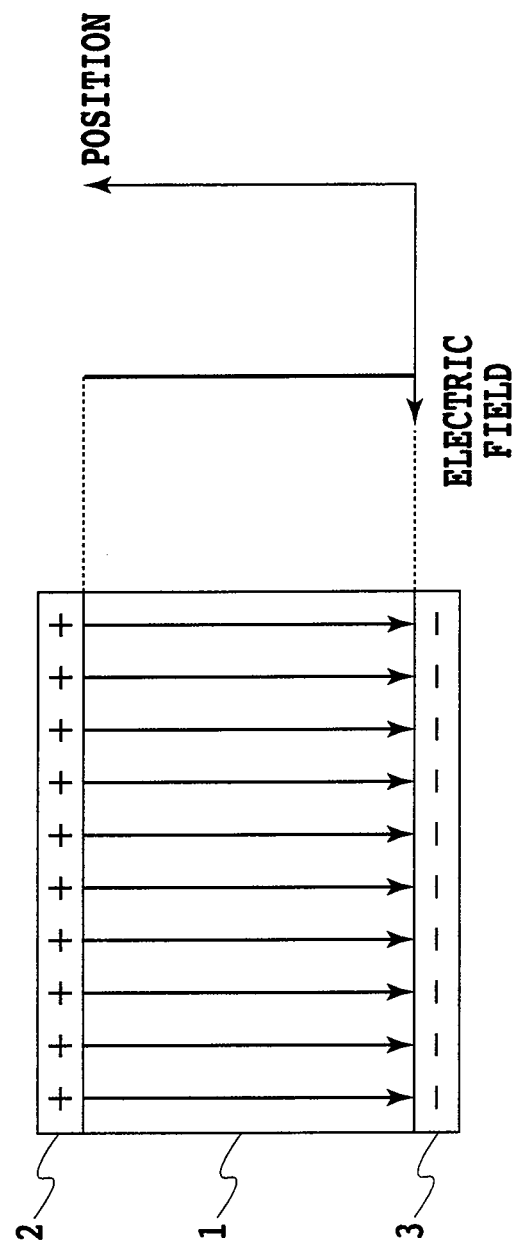
FIG. 6A is a diagram showing the principle for the occurrence of the tilt of an electric field due to charges inside a crystal.
Figure 6B:
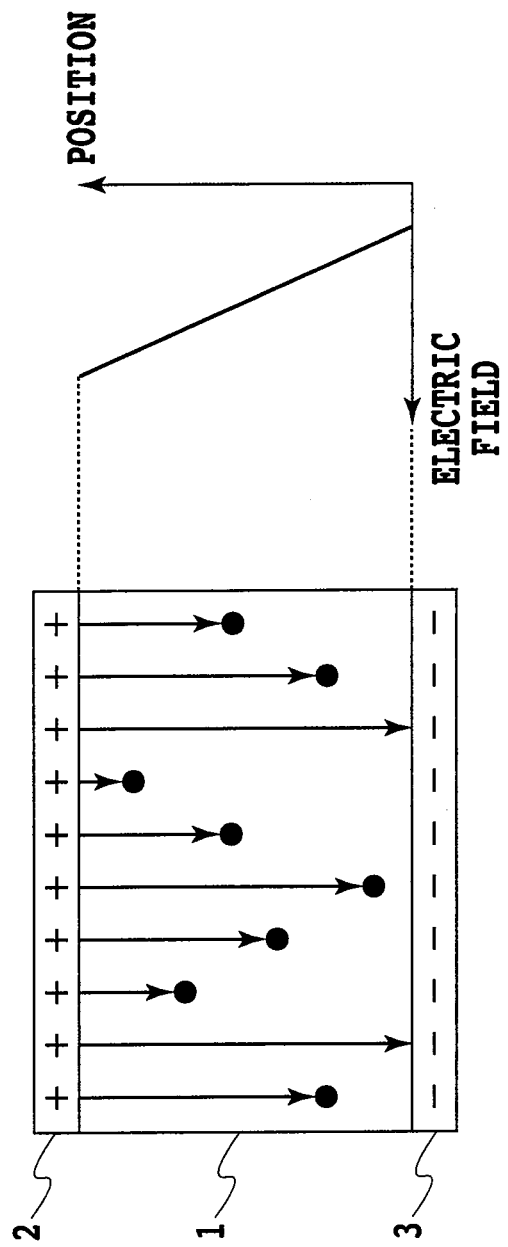
FIG. 6B is a diagram showing the principle for the occurrence of the tilt of an electric field due to charges inside a crystal.

FIGS. 6A and 6B show the principle behind the generation of a tilt in an electric field due to a charge held by the crystal. Both devices shown in FIGS. 6A and 6B include an electrooptic crystal 1 sandwiched by a positive electrode 2 and a negative electrode 3, in parallel. Further, a graph is shown, for which the vertical axis represents a distance from the negative electrode 3 to the positive electrode 2, and the horizontal axis represents the intensity of the electric field held by the electrooptic crystal 1. In FIG. 6A, a case is shown wherein a space charge is not held in the electrooptic crystal 1 and an electric field is fixed. In this case, the electric field is fixed for the entire space between the positive electrode 2 and the negative electrode 3. On the other hand, in FIG. 6B, a case is shown wherein a space-charge limited state is produced by space charges in the electrooptic crystal 1. In the space-charge limited state, the electric field is terminated by space charges generated in the electrooptic crystal 1, and the electric field distribution within the electrooptic crystal 1 is tilted. In accordance with the composition of the electrooptic crystal 1, the space charges may be either positive or negative charges, or may be both.

Figure 7:
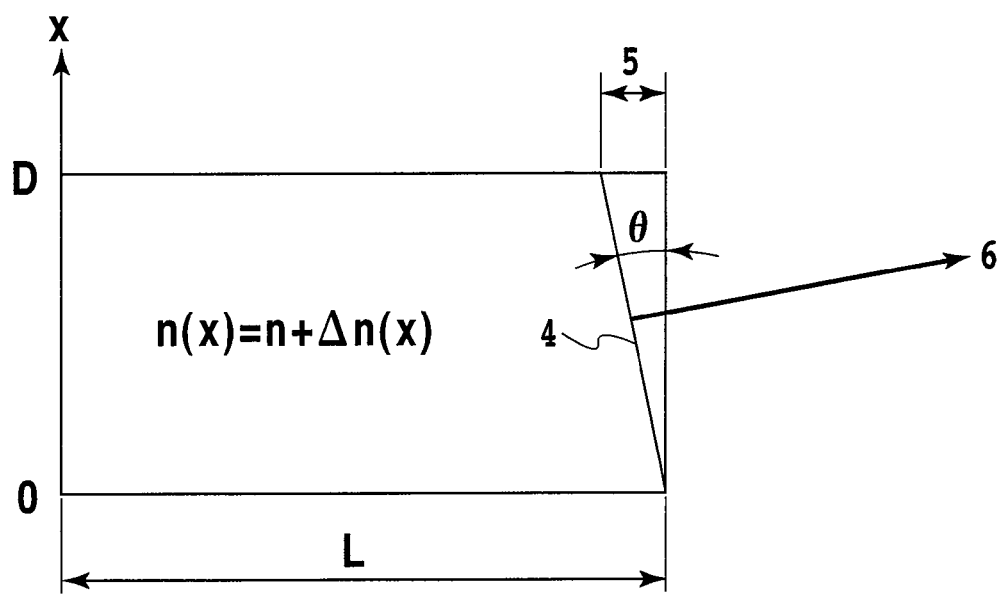
FIG. 7 is a diagram showing the principle of deflection of light due to a field tilt.

FIG. 7 shows the principle behind the deflection of light by a field tilt. In FIG. 7, the x axial direction is the direction of thickness of the electrooptic crystal 1 (the direction from the positive electrode 2 to the negative electrode 3, or from the negative electrode 3 to the positive electrode 2 in FIGS. 6A and 6B). A refractive index n(x) that is linearly changed in the direction of thickness (the x axial direction) of the electrooptic crystal 1 is defined as n(x)=n+Δn(x), where n denotes a refractive index when x=0 and Δn(x) denotes a refractive index change in the refractive index n at x. In a case wherein a beam having a diameter D in cross section, perpendicular to the light axis, is passed inside the electrooptic crystal 1, a refractive index difference between the upper end and the lower end of the beam is provided by Δn(D)−Δn(0). When L denotes the length of a portion where the beam is passed through and where the inclination of the refractive index is present, i.e., the interaction length, after the beam is propagated through the portion of the length L, a shift 5 occurs on an equiphase wave surface 4 between the upper end and lower end of the beam. The distance of the shift 5 on the equiphase wave surface 4, between the upper end and the lower end, is provided by the following expression.

[Expression 8]

$$L\frac{\Delta n(D) - \Delta n(0)}{n} \quad (7)$$

At this time when the value of the shift 5 is considerably smaller than the diameter in the cross section perpendicular to the light axis of the beam, inclination θ, in a beam propagation direction 6, is represented by the following expression.

[Expression 9]

$$\theta' = -\frac{L}{n}\frac{\Delta n(D) - \Delta n(0)}{D} = -\frac{L}{n}\frac{d}{dx}\Delta n(x) \quad (8)$$

When the beam is output at the end face of the electrooptic crystal 1 to the outside area having a refractive index approximately "1", the beam is refracted to the boundary plane between the electrooptic crystal 1 and the outside, and the total deflection angle, relative to the light axis of incident light, is represented by the following expression.

[Expression 10]

$$\theta = -L\frac{d}{dx}\Delta n(x) \quad (9)$$

Here, consider the change in a refractive index based on the electrooptic effect. The change in a refractive index, based on the electrooptic effect, is provided by the following respective expressions for the linear Pockels effect and the quadratic Kerr effect.

[Expression 11]

$$\text{Pockels effect: } \Delta n = -\frac{1}{2}n^3 r_{ij} E \quad (10)$$

$$\text{Kerr effect: } \Delta n = -\frac{1}{2}n^3 s_{ij} E^2 \quad (11)$$

In a case wherein charges are generated in a crystal, and wherein an electric field generated by an electrode is terminated using the charges before the field reaches the ground electrode, so that the electric field is changed in the direction of the thickness of the crystal, when the electric field is represented by E(x), a deflection angle θ is obtained by the following expression.

[Expression 12]

$$\text{Pockels effect: } \theta = -\frac{1}{2}n^3 r_{ij} L \frac{d}{dx} E(x) \quad (12)$$

$$\text{Kerr effect: } \theta = -\frac{1}{2}n^3 s_{ij} L \frac{d}{dx}\{E(x)^2\} \quad (13)$$

These expressions indicate that, in a case wherein the field effect E(x) is changed, which depends on x, a deflection angle other than 0 is generated.

As shown in FIG. 6B, when a voltage V is applied between the positive electrode 2 and the grounded negative electrode 3 for the electrooptic crystal 1, which has a thickness d in the space-charge limited state, the space distribution of the electric field E, represented by the following expression, appears.

[Expression 13]

$$E = -\frac{3V}{2d}\sqrt{\frac{x+x_0}{d}}\frac{1}{\left(1 + \frac{x_0}{d}\right)^{3/2} - \left(\frac{x_0}{d}\right)^{3/2}} \quad (14)$$

Here, x denotes the position relative to the side face, in a direction from the negative electrode to the opposite positive electrode, of the electrooptic crystal 1 that contacts the negative electrode. $x_0$ is a constant determined by the materials of the electrooptic crystal and the electrodes.

Here, when the approximation of the electric field E is calculated using the following expression,

[Expression 14]

$$E = -\frac{3}{2d}\sqrt{\frac{x+x_0}{d}} \quad (15)$$

For a case of the linear Pockels effect and the quadratic Kerr effect, the refractive index change Δn that is induced, based on the electrooptic effect, is provided using the following expression by substituting expression (14) into expressions (10) and (11).

[Expression 15]

$$\text{Pockels effect: } \Delta n = -\frac{1}{2}n^3 r_{ij} E = -\frac{3}{4}n^3 r_{ij}\frac{V}{d}\sqrt{\frac{x+x_0}{d}} \quad (16)$$

$$\text{Kerr effect: } \Delta n = -\frac{1}{2}n^3 s_{ij} E^2 = -\frac{9}{8}n^3 s_{ij}\left(\frac{V}{d}\right)^2\frac{x+x_0}{d} \quad (17)$$

Therefore, based on expressions (12), (13), (16) and (17), a deflection angle $\theta(x)$ is represented by the following expression.

[Expression 16]

$$\text{Pockels effect: } \theta(x) = -L\frac{d}{dx}\Delta n(x) = \frac{3}{8}Ln^3 r_{ij}\left(\frac{x+x_0}{d}\right)^{-1/2}\left(\frac{V}{d}\right) \quad (18)$$

$$\text{Kerr effect: } \theta(x) = -L\frac{d}{dx}\Delta n(x) = \frac{9}{8}Ln^3\frac{s_{ij}}{d}\left(\frac{V}{d}\right)^2 \quad (19)$$

As described above, by applying a voltage to the electrooptic crystal, a space charge is generated inside the electrooptic crystal, and the tilt of the electric field occurs in the cross section perpendicular to the light axis of an incident beam. Because of the tilt of the electric field, an inclination is generated upon the change in the refractive index, and generated on the distribution of the speed at which light advances on the cross section perpendicular to the light axis of a beam. As a result, during propagation of light in the crystal, the advance direction of the light is sequentially changed in accordance with the tilt of the refractive index, and the deflection angle is accumulated. On the other hand, since tilting of the electric field occurs in the direction in which the voltage is applied, it is found that a shift angle of beam deflection is generated between vertically polarized light and horizontally polarized light. Therefore, when the field tilt is increased, the beam deflection by the light deflector can be efficiently increased, or when the field tilt is decreased, the optical phase modulator can efficiently perform optical phase modulation.

Sequentially, while focusing on expression (14), $x_0$ is a value that depends on the efficiency of an injection of the carrier from the electrode to the electrooptic crystal, and the smaller $x_0$ is, the more the injection efficiency is increased. If $x_0$ can be reduced, a field difference between the positive electrode and the negative electrode is increased, and accordingly, the tilt of the refractive index becomes large, so that beam deflection can be efficiently increased. On the other hand, if $x_0$ can be increased, a field difference between the positive electrode and the negative electrode is reduced, and accordingly, the tilt of the refractive index becomes small, so that beam deflection can be lowered and the shift angle between vertically polarized light and horizontally polarized light can be reduced.

(Work Function of an Electrode Material)

Figure 8:
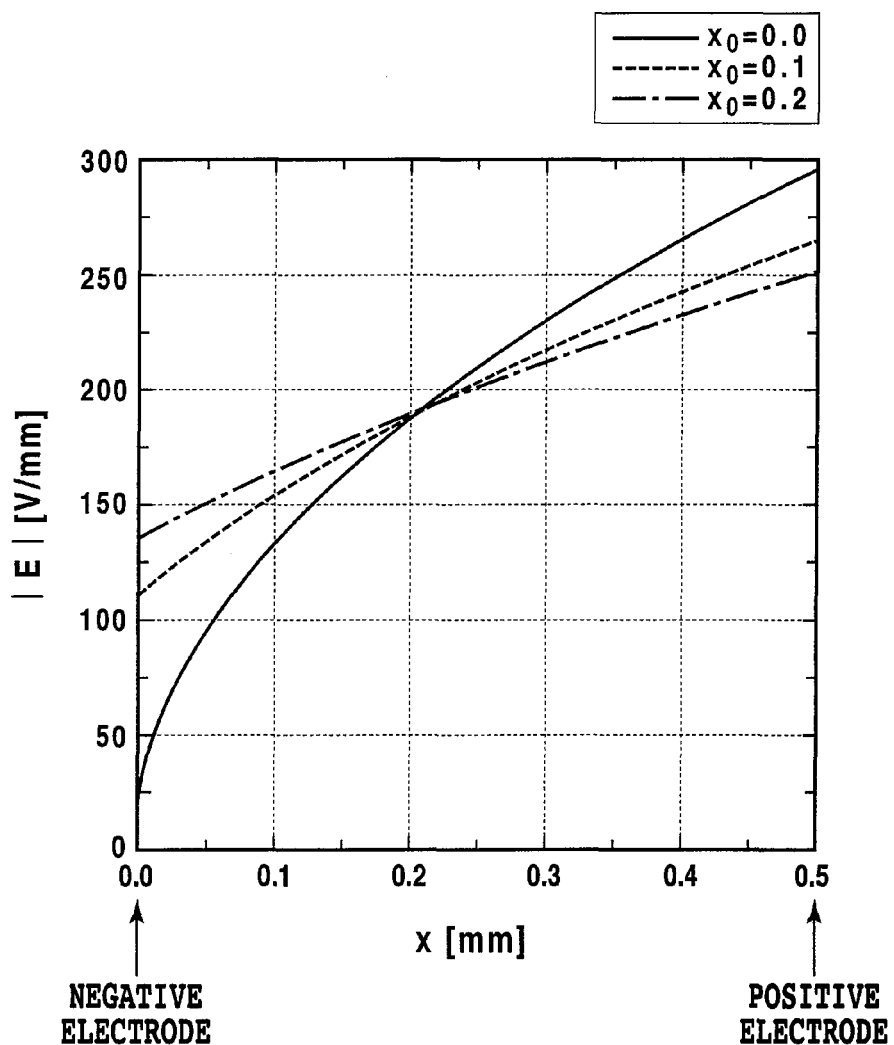
FIG. 8 is a graph showing a relationship between $x_0$ and a space distribution for an electric field E.
Figure 9:
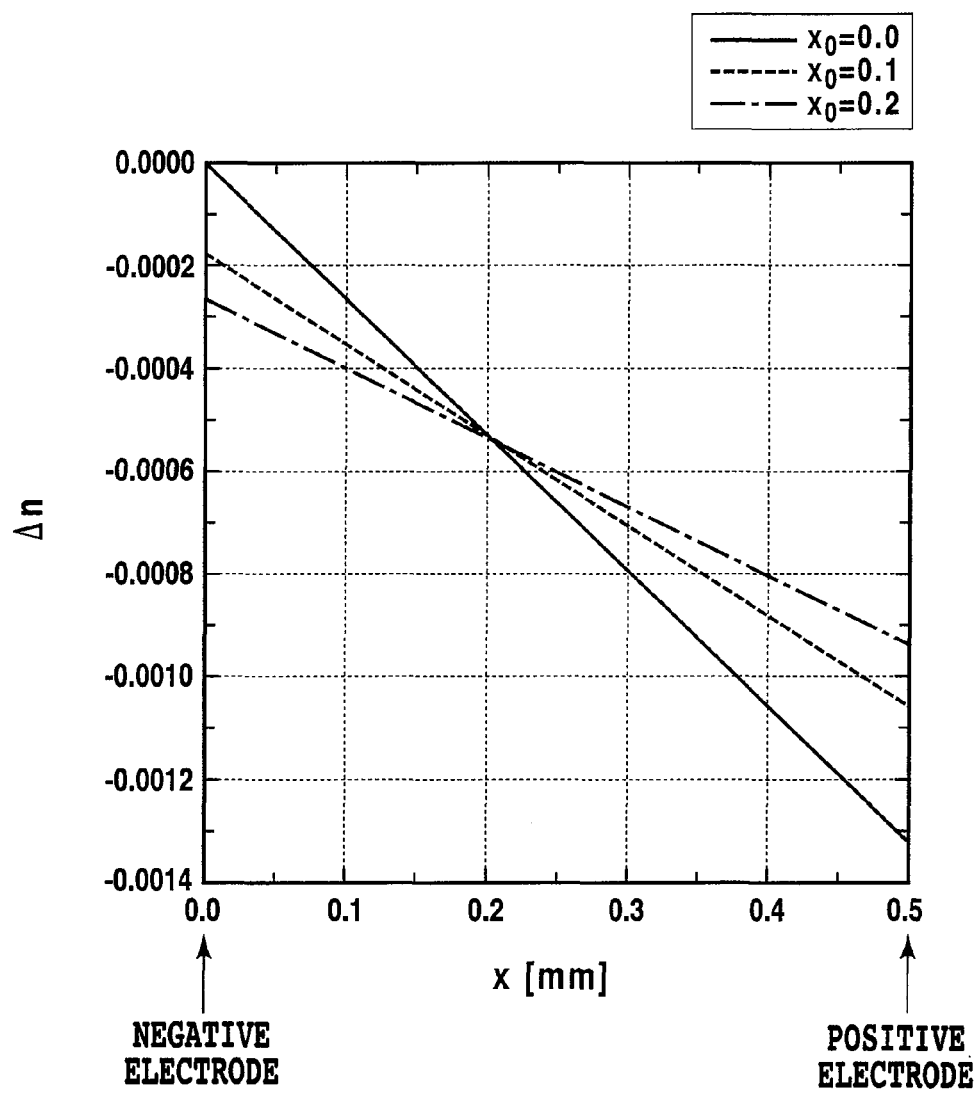
FIG. 9 is a graph showing a distribution of a refractive index change $\Delta n$ due to the Kerr effect.

FIG. 8 is a graph showing a relationship between $x_0$ and the space distribution of the electric field E. Furthermore, FIG. 9 shows distribution of a refractive index change $\Delta n$, based on the Kerr effect. An electrooptic crystal of KLTN crystal having a refractive index of 2.2 is employed, and the distance between the positive and negative electrodes is set as 0.5 mm, while the electrode length is set as 5.0 mm. An applied voltage is 100 V, and the quadratic electrooptic constant $s_{ij}$ is $2.85 \times 10^{15}$ m$^2$/V$^2$. It is apparent that, when $x_0=0$, the tilt of the refractive index is the largest. At $x_0=0$ the electrode and the electrooptic crystal need only provide the ideal ohmic contact, as it is apparent from FIG. 8 that when $x=0$, the electric field is 0 at the negative electrode.

The electrooptic crystal that is a KLTN crystal is cut to obtain a size 6 mm long z 5 mm wide×0.5 mm thick, and electrodes 5 mm long×4 mm wide are attached to opposite faces. For the KLTN crystal, electrodes are carriers that contribute to electrical conduction. Four types of electrode materials, Ti, Cr, Au and Pt, are prepared. A voltage of 100 V is applied between the positive and negative electrodes, and the deflection angle of light that is vertically advancing is measured.

Figure 10:
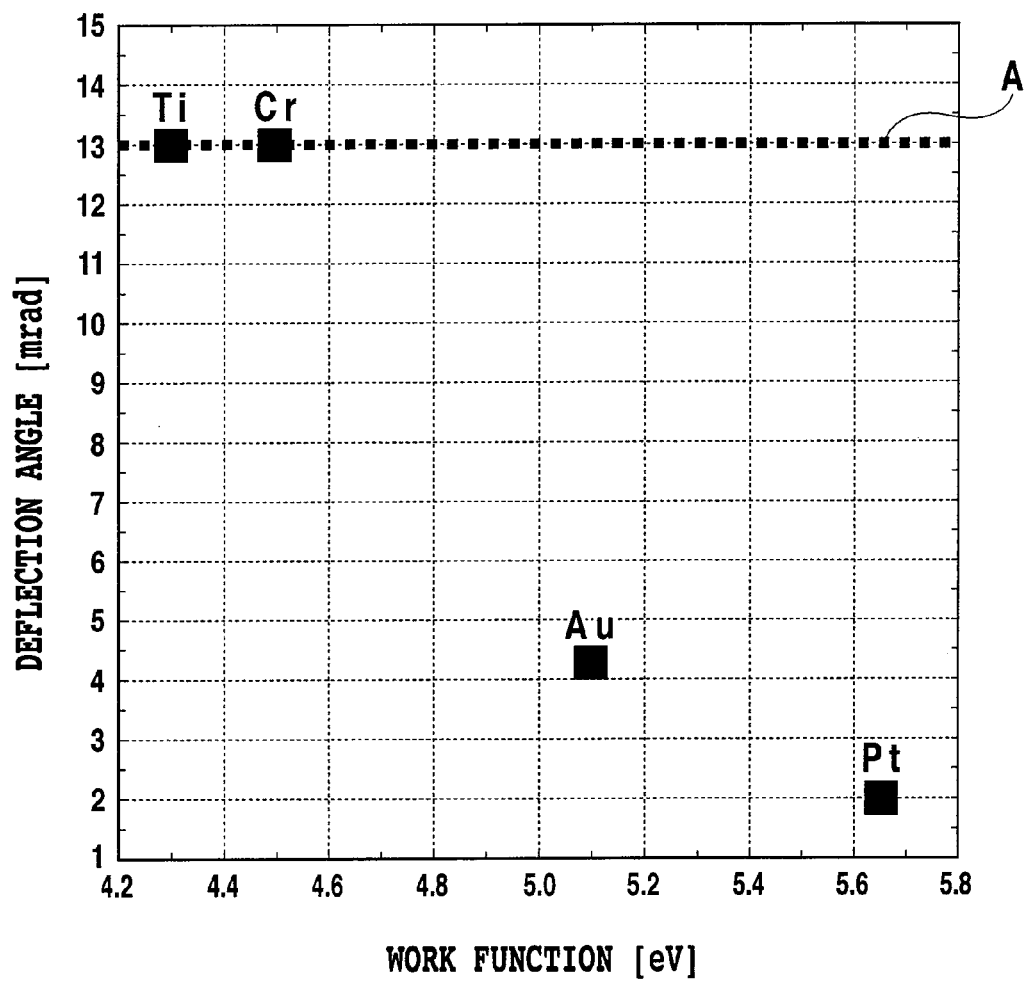
FIG. 10 is a graph showing a relationship between the work function of an electrode material and a deflection angle.

FIG. 10 shows a relationship between the work functions of the electrode materials and the deflection angle. A dotted line A in the graph indicates a deflection angle at the maximum electron injection efficiency, i.e., a deflection angle at x=0 in FIG. 8. Therefore, in a case wherein Ti or Cr is employed as an electrode material, the ideal ohmic contact is provided, and the injection efficiency reaches the maximum. As the work function of the electrode material is increased, the contact becomes similar to the Schottky contact, and the carrier injection efficiency is reduced. Based on this, it is preferable in a case involving an optical deflector that the work function of the electrode material be smaller than 5.0 eV, in a case wherein electrons are carriers that contribute to the electrical conduction of the electrooptic crystal. Therefore, in a case wherein electron holes are carriers that contribute to the electrical conduction of the electrooptic crystal, it is preferable that the work function of the electrode material be equal to or greater than 5.0 eV.

Figure 11:
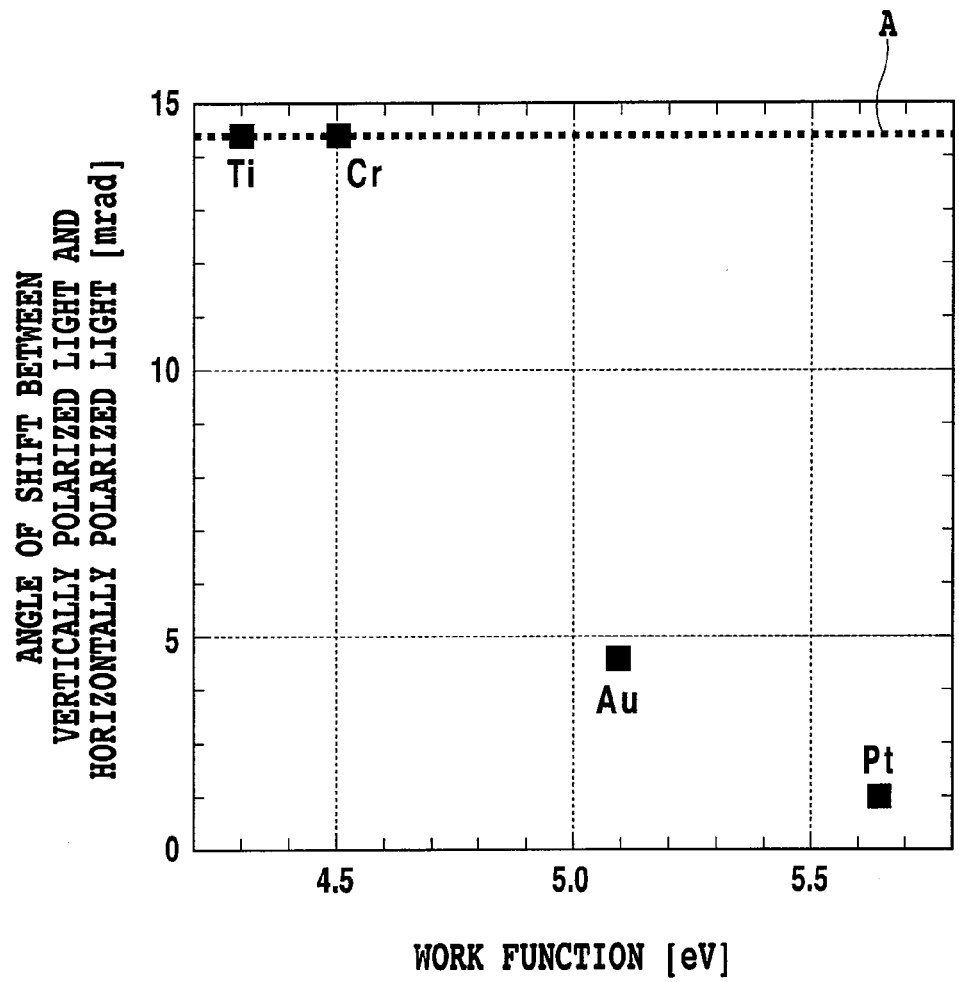
FIG. 11 is a graph showing a relationship between the work function of an electrode material and a shift angle.

Following this, a voltage of 100 V is applied between the positive and negative electrodes of the above described electrooptic crystal, which is a KLTN crystal, and a shift angle between the vertically polarized light and horizontally polarized light is measured. FIG. 11 shows a relationship between the work function of the electrode material and a shift angle. A dotted line A in the graph indicates a shift angle between vertically polarized light and horizontally polarized light when the electron injection efficiency reaches the maximum.

In a case for an optical phase modulator, contrary to the above described case for the optical deflector, the injection of conductive electrons is reduced and a shift angle becomes smaller in a case wherein Au or Pt is employed as an electrode material. Therefore, in a case wherein electrons are carriers that contribute to electrical conduction of the electrooptic crystal, it is preferable that the work function of the electrode material be equal to or greater than 5.0 eV. On the other hand, in a case wherein electron holes are the carriers that contribute to electrical conduction of the electrooptic crystal, it is preferable that the work function of the electrode material be smaller than 5.0 eV.

As an electrode material for which the work function is smaller than 5.0 eV, one of the following materials can be employed: Cs (2.14), Rb (2.16), K (2.3), Sr (2.59), Ba (2.7), Na (2.75), Ca (2.87), Li (2.9), Y (3.1), Sc (3.5), La (3.5), Mg (3.66), As (3.75), Ti (3.84), Hf (3.9), Zr (4.05), Mn (4.1), In (4.12), Ga (4.2), Cd (4.22), Bi (4.22), Ta (4.25), Pb (4.25), Ag (4.26), Al (4.28), V (4.3), Nb (4.3), Ti (4.33), Zn (4.33), Sn (4.42), B (4.45), Hg (4.49), Cr (4.5), Si (4.52), Sb (4.55), W (4.55), Mo (4.6), Cu (4.65), Fe (4.7), Ru (4.71), Os (4.83), Te (4.95), Re (4.96), Be (4.98) and Rh (4.98). A value in parenthesis represents a work function. Further, an alloy employing a plurality of these materials may be employed. For example, since an electrode formed of a single Ti layer becomes highly resistant through oxidization, generally, an electrode formed by laminating Ti/Pt/Au is employed to bond the Ti layer and the electrooptic crystal. Further, a transparent electrode made of ITO (Indium Tin Oxide), ZnO, etc., may also be employed.

As an electrode material having a work function that is equal to or greater than 5.0 eV, the following material can be employed: Co (5.0), Ge (5.0), Au (5.1), Pd (5.12), Ni (5.15), Ir (5.27), Pt (5.65) or Se (5.9). Furthermore, an alloy employing a plurality of these materials may be employed.

(Dielectric Constant of an Electrooptic Crystal)

Figure 12:
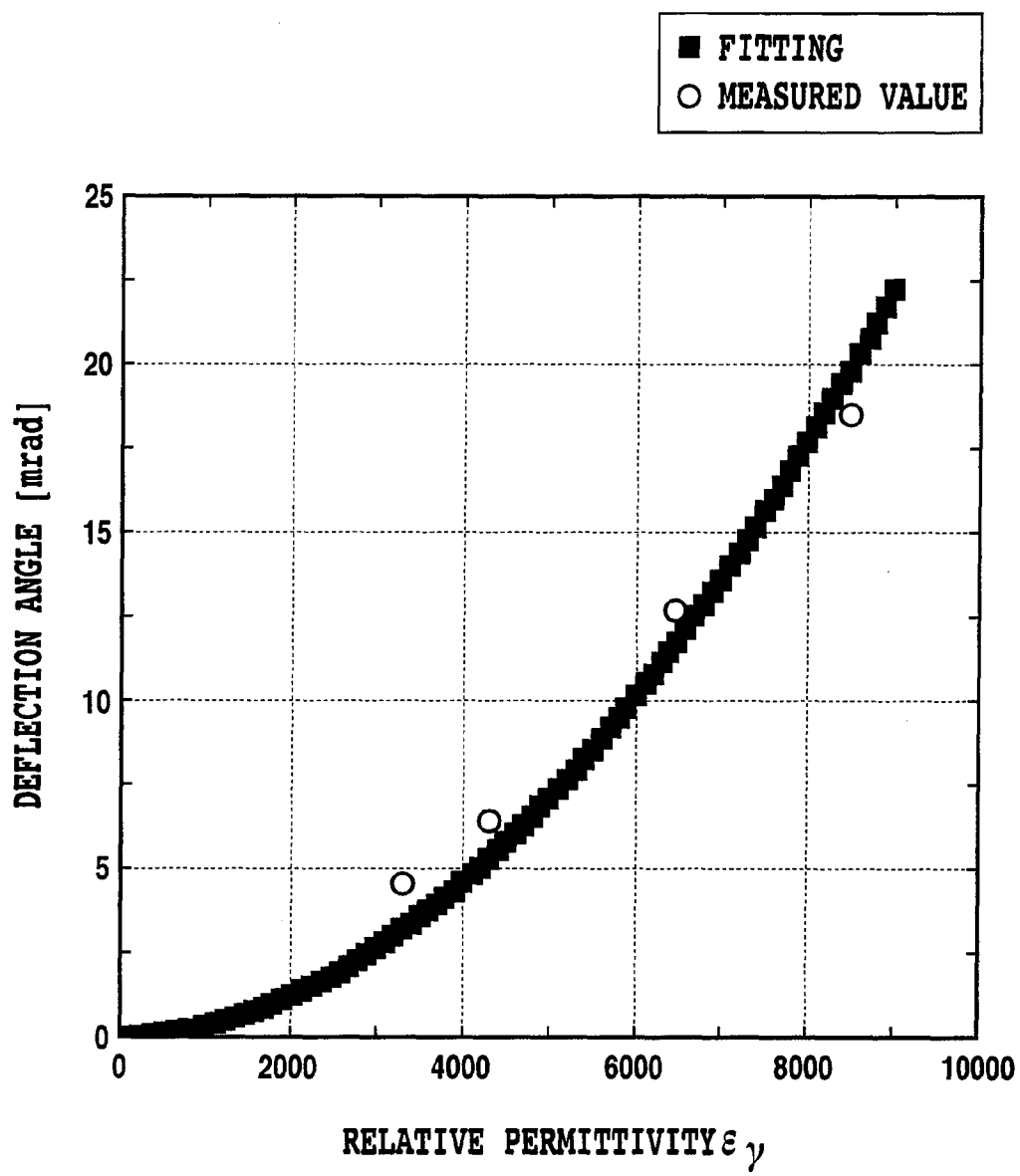
FIG. 12 is a graph showing a relationship between the relative permittivity of an electrooptic crystal and a deflection angle.

An electrooptic crystal that is a KLTN crystal is cut to obtain a size 6 mm long×5 mm wide×0.5 mm thick, and electrodes of 5 mm long×4 mm wide are attached to opposite faces. Here, Cr is employed as the electrode material. FIG. 12 shows a relationship between the relative permittivity of the electrooptic crystal and a deflection angle. An electric field of 200 V/mm is applied between the positive and negative electrodes, and the deflection angle of light that is advancing vertically is measured. At this time, the measurement is performed while the dielectric constant is being changed by altering the temperature of the electrooptic crystal. And the obtained results are shown.

Figure 13:
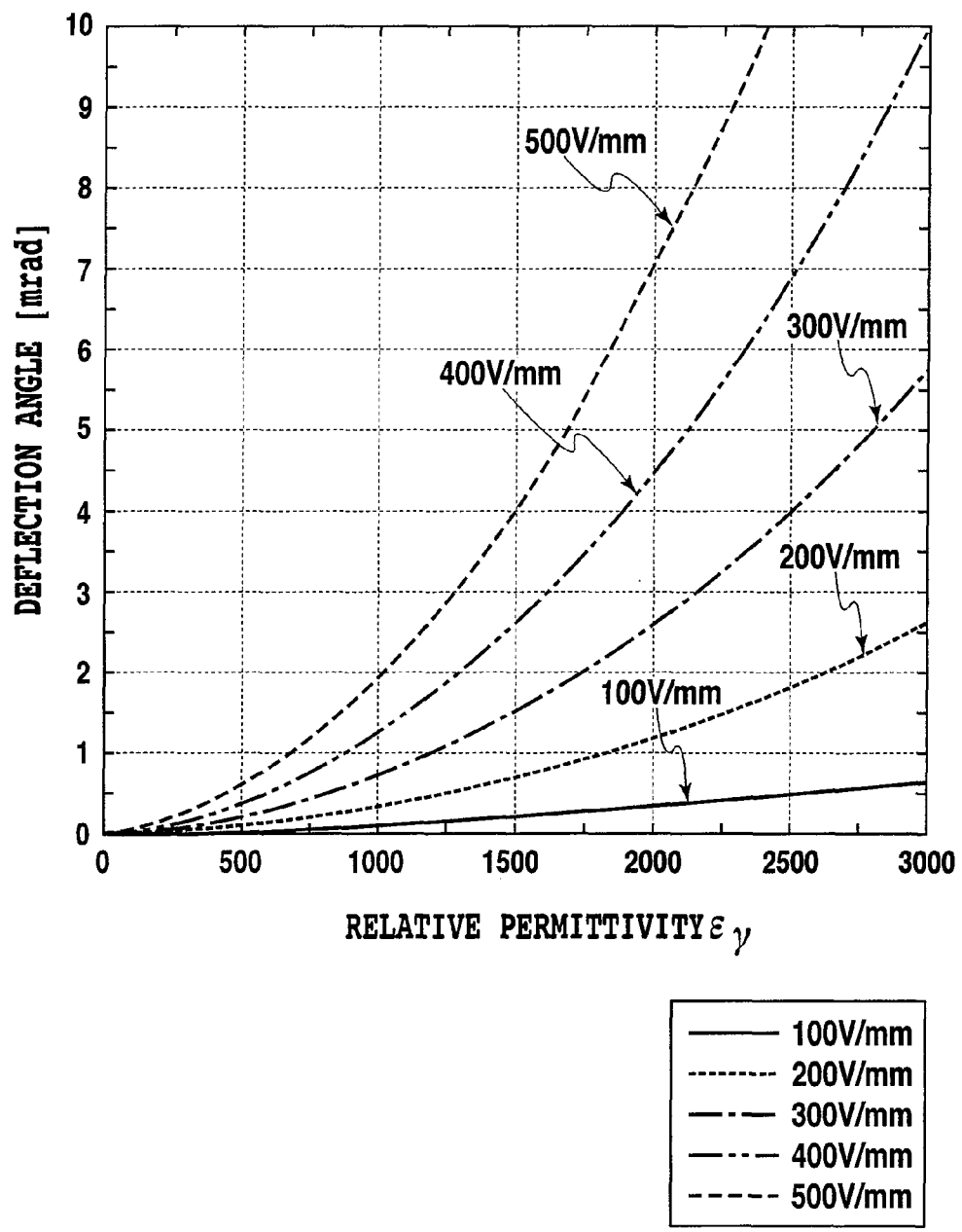
FIG. 13 is a graph showing the relative permittivity dependency of a deflection angle when an electric field to be applied is changed.

The deflection angle is proportional to the difference in the refractive index change between the positive electrode and the negative electrode, i.e., the inclination of a linear line shown in FIG. 9. In a case concerning the quadratic electrooptic effect, the refractive index change is proportional to the square of the dielectric constant. Therefore, since the deflection angle is proportional to the square of the relative permittivity, fitting with the quadratic function is performed for the measured value shown in FIG. 12, and the obtained fitting results are also shown. In addition, in a case concerning the quadratic electrooptic effect, since the refractive index change is proportional to the square of the applied voltage, the applied voltage is changed based on the results shown in FIG. 12, and the relative permittivity dependency of the deflection angle obtained at this time is shown in FIG. 13.

Figure 14:
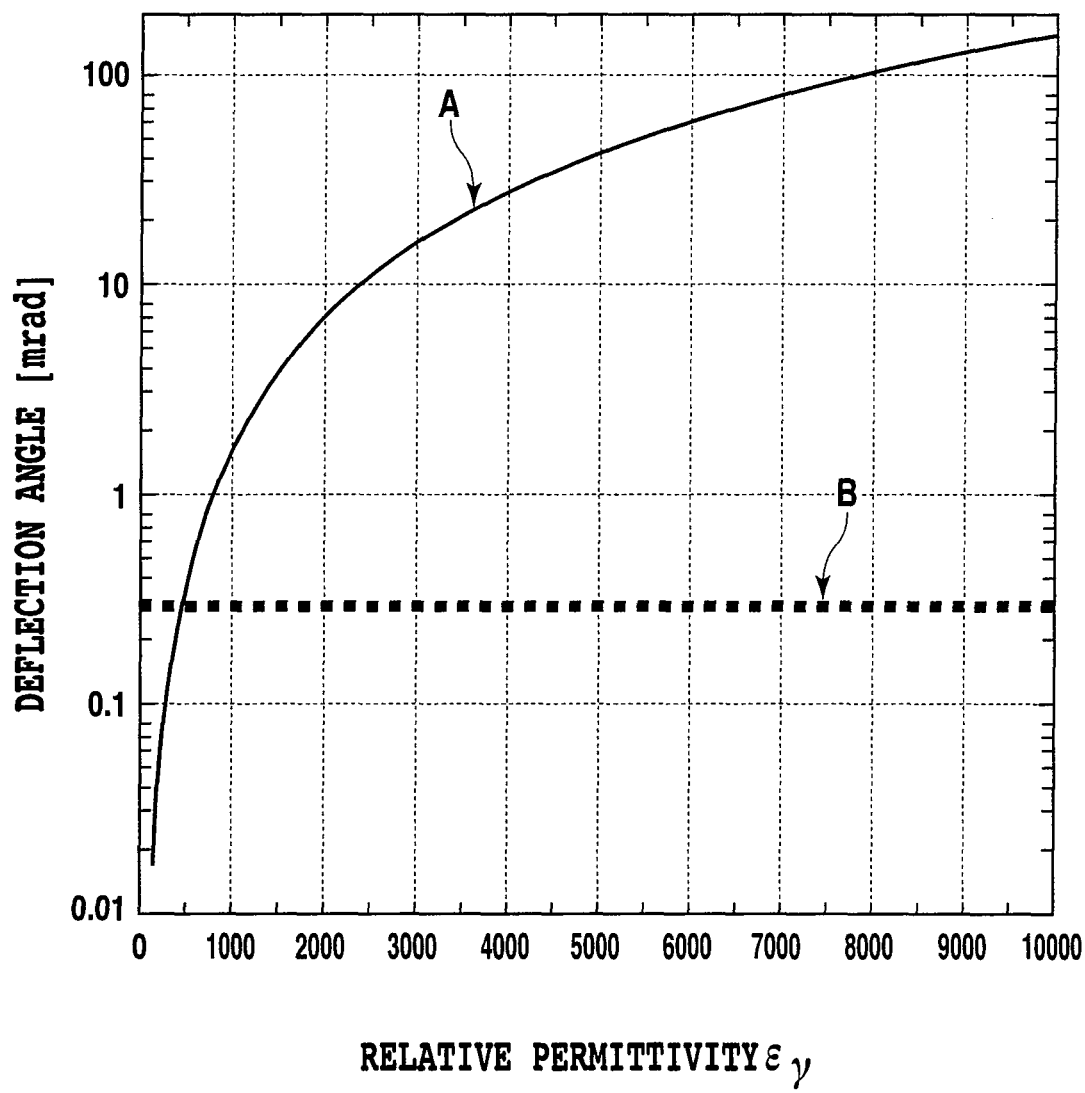
FIG. 14 is a graph showing the deflection angle of an electrooptic device according to one mode of the present invention and the deflection angle of a conventional prism.

While referring to FIG. 14, the deflection angle of the electrooptic device according to the mode of the present invention will be compared with the deflection angle of a conventional prism. A solid line A indicates a relative permittivity obtained when an electric field of 500 V/mm is applied to the positive and negative electrodes of the electrooptic crystal, which is the above KLTN crystal, and the temperature of the electrooptic crystal is changed. A dotted line B indicates a deflection angle=0.3 mrad when an electric field of 500 V/mm is applied. Therefore, when the electrooptic crystal, which is the KLTN crystal whose relative permittivity is 500 or higher, is employed in the space-charge limited state, the same deflection angle can be obtained in the same applied electric field. Furthermore, as shown in FIG. 14, since the relative permittivity dependency of the deflection angle is reduced when the relative permittivity exceeds 10000, the relative permittivity of the electrooptic crystal is appropriately equal to or smaller than 40000.

In this mode, it is important that one or both of the Pockels effect and the Kerr effect, which are electrooptic effects of the electrooptic crystal, should be ready to be revealed. In a case wherein a beam is to be deflected by the Pockels effect, a device that changes the deflection angle depending on the position of a beam is provided. On the other hand, in a case wherein a beam is to be deflected using the Kerr effects, a device that fixes the deflection angle, regardless of the position of the beam, can be provided. Furthermore, in order to increase the refractive index change, the efficiency of injection of carriers from the electrode to the electrooptic crystal should be increased, and an appropriate electrode material should be selected. The preset invention will be described in detail by employing embodiments; however, the present invention is not limited to the following embodiments.

Embodiment 1

Figure 15:
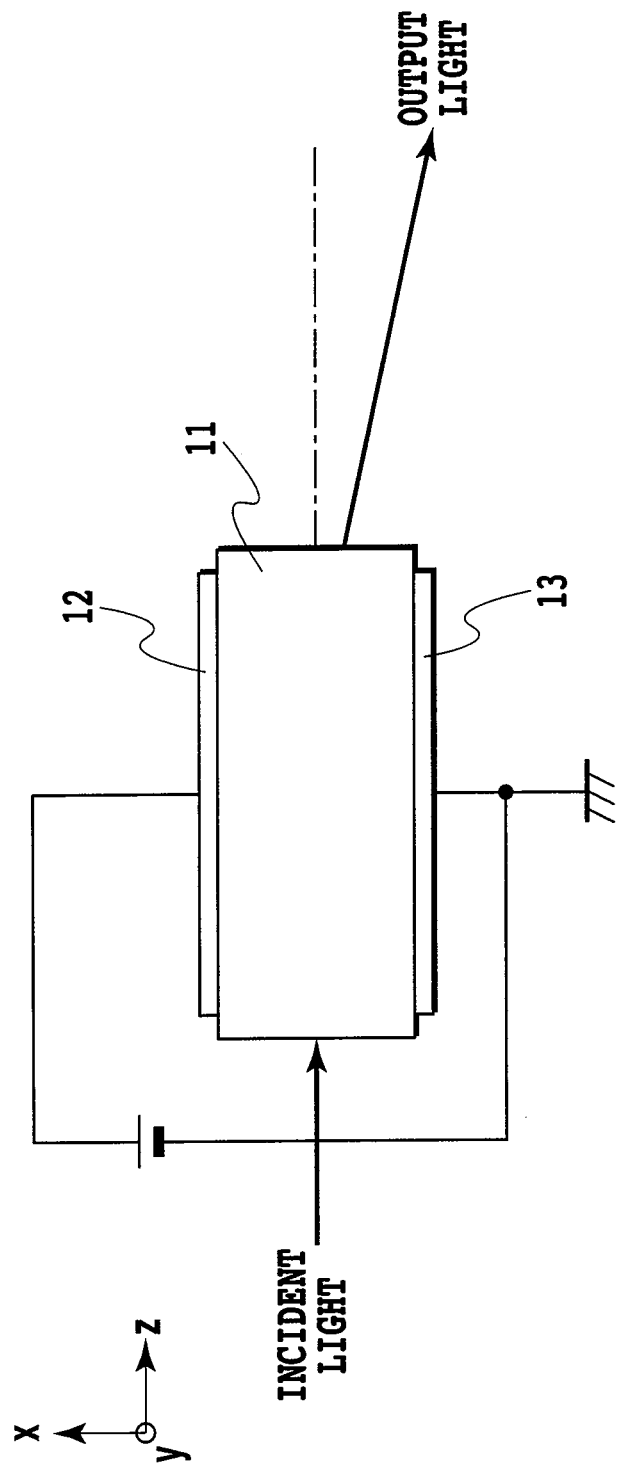
FIG. 15 is a diagram illustrating an electrooptic device of a parallel-plate electrode type according to embodiment 1 of the present invention.

FIG. 15 shows an electrooptic device of a parallel-plate electrode type according to embodiment 1 of the present invention. A KLTN crystal (in $K_{1-y}Li_yTa_{1-x}Nb_xO_3$, x=about 0.40 and y=about 0.001) is cut in the shape of a rectangle, and an electrooptic crystal 11, of which four faces are polished, is prepared. A positive electrode 12 and a negative electrode 13 made of Ti/Pt/Au are formed on the upper face and the lower face of the electrooptic crystal 11. The size of the electrooptic crystal 11 is 6 mm (z axis)×5 mm wide (y axis)×0.5 mm thick (x axis), and the size of each electrode is 5 mm long x 4 mm wide. In this specification, Ti/Pt/Au is used to indicate that Pt and Au are laminated, in this order, on a lowermost layer of Ti.

The KLTN crystal is an electrooptic crystal having an electrooptic constant that is great near the phase transition from the cubic system to the tetragonal system. Since the phase transition temperature of the KLTN crystal employed for the embodiment 1 is 55° C., a Peltier device and a resistance bulb are employed to set the temperature of this device to 60° C., which is higher by about 5° C. than the phase transition temperature. Thus, the Kerr effect can be employed as the electrooptic effect of the KLTN crystal. As described above, revealing the electrooptic effect of the electrooptic crystal depends on the temperature inside the electrooptic crystal.

Therefore, temperature adjustment means should be provided so that, in a case wherein the environmental temperature inside the electrooptic device is not a temperature for revealing the electrooptic effect of the electrooptic crystal, the electrooptic crystal is maintained at a desired temperature.

Figure 16:
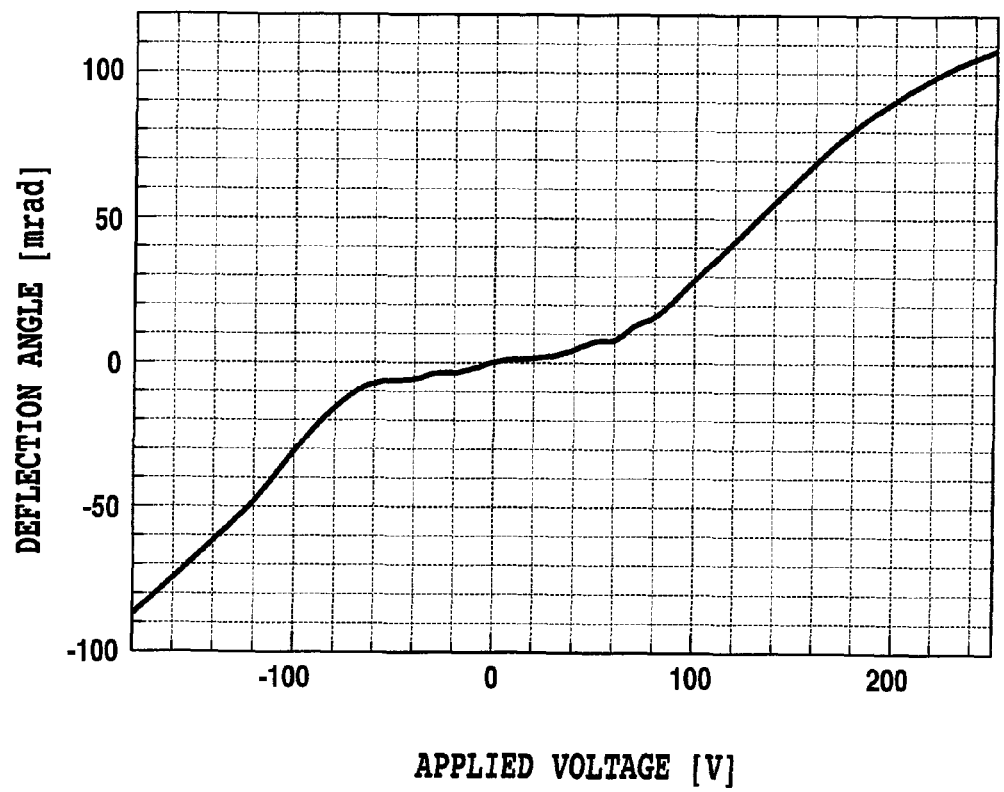
FIG. 16 is a graph showing a relationship between the deflection angle of a deflected beam and an applied voltage.

Light emitted by a He—Ne laser enters from one of the end faces of the electrooptic crystal 11. So long as light falls within the transmission area of the electrooptic crystal 11, an arbitrary wavelength can be applied. Using a polarization plate and a half-wave plate, the polarized element of the incident light is defined only as the element in the polarization axial direction that is parallel to the electric field. The deflection angle of the incident light is changed in consonance with a direct-current voltage applied to the positive electrode 12 and the negative electrode 13. FIG. 16 shows a relationship between the deflection angle of a deflected beam and the applied voltage. The maximum deflection angle of 108 mrad, relative to the applied voltage of +250 V, and the maximum deflection angle of −85 mrad, relative to the applied voltage of −190 V, are obtained. That is, a deflection angle of almost 200 mrad in total can be provided.

Figure 17:
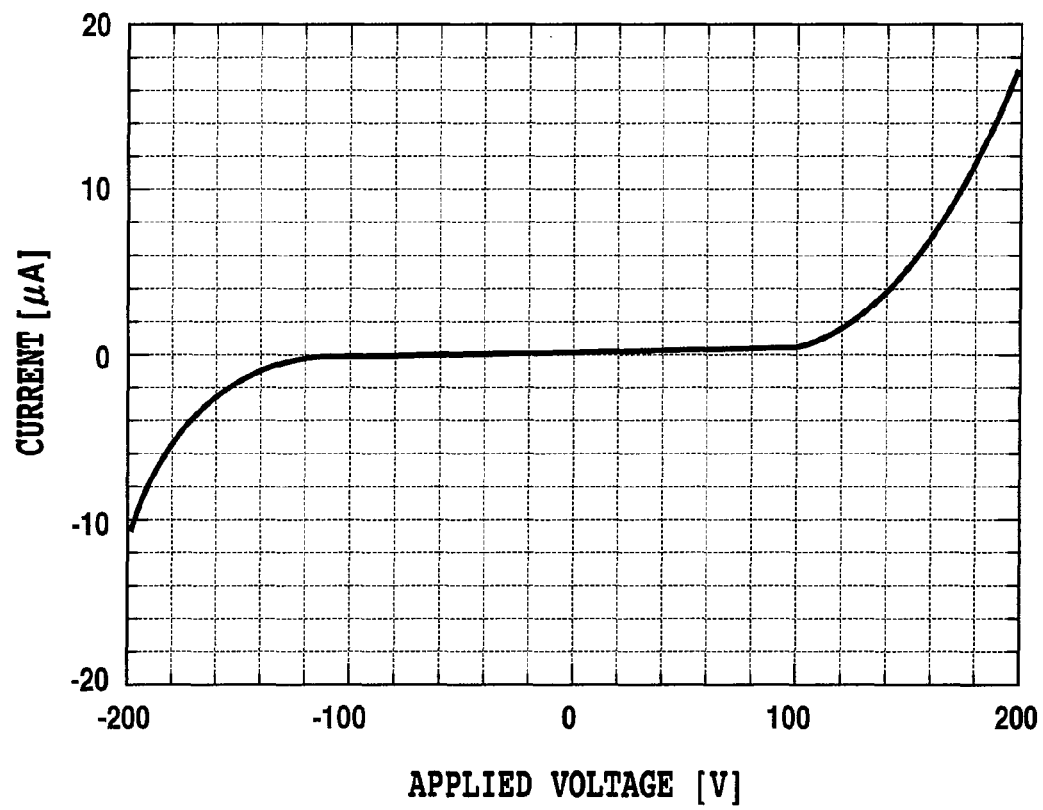
FIG. 17 is a graph showing a relationship between a current, which is flowing across an electrooptic crystal according to embodiment 1 of the present invention, and an FIG. 18 is a diagram illustrating an electrooptic device of a horizontal electrode type according to embodiment 2 of the present invention.

FIG. 17 shows a relationship between a current flowing through the electrooptic crystal 11 and the applied voltage. Since a current flowing through the electrooptic crystal 11 is non-linearly changed relative to the direct-current voltage applied to the positive electrode 12 and the negative electrode 13, it can be said that the area of the electrooptic crystal 11 where the electric field is generated is in the space-charge limited state.

When the above described simple and symmetrical structure, which includes the rectangular electrooptic crystal 11 and the parallel-plate positive electrode 12 and negative electrode 13, is employed, a large deflection angle that cannot be provided by a conventional electrooptic crystal prism can be obtained.

Furthermore, an alternating-current voltage may be applied to the electrodes instead of a direct-current voltage to change the deflection angle of a deflected beam in the timetransient manner. The electrooptic device for the embodiment 1 can be responsive within the range of a response frequency that is determined based on the electrooptic constant (see non-patent document 2), and can respond to an alternating-current voltage at a high frequency, equal to or higher than 1 kHz.

Conventionally, a KTN ($KTa_{1-x}Nb_xO_3$, $0<x<1$) crystal is well known as a crystal that provides a great electrooptic effect. The KTN crystal is formed like a prism, and when an electric field of 497V/mm is applied to the KTN prism, a deflection angle of about 10 mrad can be obtained (see non-patent document 3). As for the electrooptic device of the embodiment 1, since the deflection angle of about 100 mrad can be obtained upon the application of a voltage of 250 V (an application of an electric field of 500 V/mm), the deflection efficiency can be increased by ten times that obtained by the KTN prism described in non-patent document 3.

Embodiment 2

Figure 18:
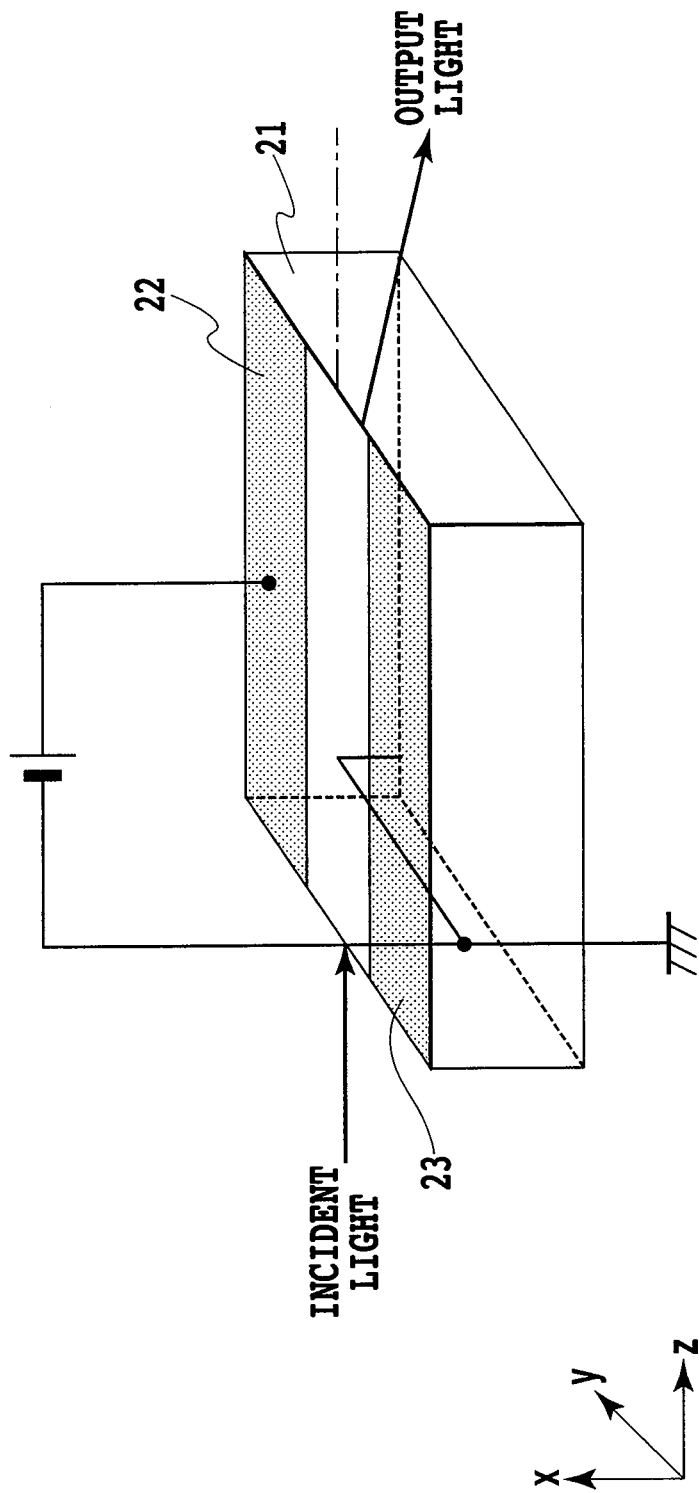

FIG. 18 shows an electrooptic device of a horizontal electrode type according to embodiment 2 of the present invention. A KLTN crystal (in $K_{1-y}Li_yTa_{1-x}Nb_xO_3$, x=about 0.40 and y=about 0.001) is cut into the shape of a rectangle, and an electrooptic crystal 21 of which four faces are polished is prepared. A positive electrode 22 and a negative electrode 23 made of Ti/Pt/Au are formed on the upper face of the electrooptic crystal 21. The size of the electrooptic crystal 21 is 6 mm (z axis)×5 mm wide (y axis)×0.5 mm thick (x axis), and the size of each electrode is 5 mm long.

The KLTN crystal is an electrooptic crystal that has an electrooptic constant that is great near the phase transition from the cubic system to the tetragonal system. Since the phase transition temperature of the KLTN crystal employed for the embodiment 2 is 55° C., a Peltier device and a resistance bulb are employed to set the temperature of this device to 60° C., which is higher by about 5° C. than the phase transition temperature. Thus, the Kerr effect can be employed as the electrooptic effect of the KLTN crystal.

Light emitted by a He—Ne laser enters through one of the end faces of the electrooptic crystal 21. So long as light falls within the transmission area of the electrooptic crystal 21, an arbitrary wavelength can be applied. Using a polarization plate and a half-wave plate, the polarized element of the incident light is defined only as the element in the polarization axial direction that is parallel to the crystal surface on which the electrode pair is formed. The deflection angle of the incident light is changed in consonance with a direct-current voltage applied to the positive electrode 22 and the negative electrode 23. The maximum deflection angle of ±16 mrad relative to the applied voltage of ±200 V is obtained. That is, a deflection angle of almost 32 mrad in total can be provided.

Figure 19:
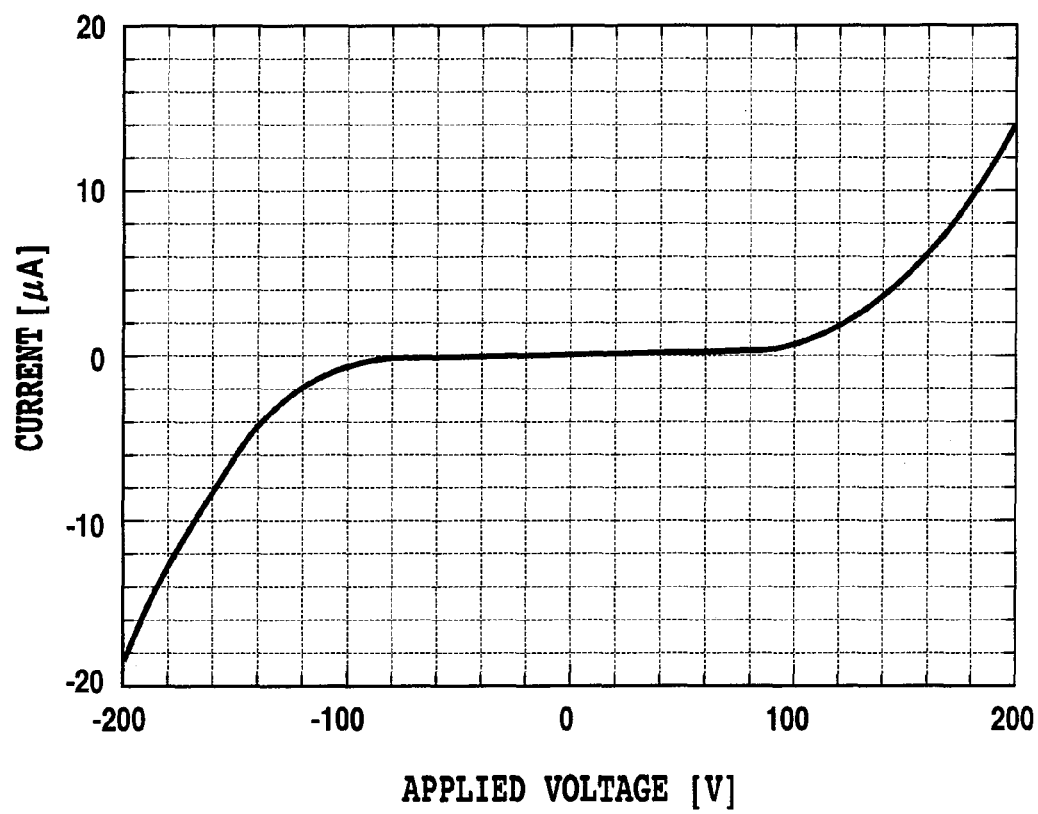
FIG. 19 is a graph showing a relationship between a current, which is flowing across a KLTN crystal according to the embodiment 2 of the present invention, and an applied voltage.

FIG. 19 shows a relationship between a current flowing through the electrooptic crystal 21 and the applied voltage. Since a current flowing through the electrooptic crystal 21 is non-linearly changed, relative to the direct-current voltage applied to the positive electrode 22 and the negative electrode 23, it can be said that the area of the electrooptic crystal 21 in which the electric field is generated is in the space-charge limited state.

When the above described simple and symmetrical structure, which includes the rectangular electrooptic crystal 21 and one pair of the positive electrode 22 and negative electrode 23 formed on the crystal surface, is employed, a large deflection angle that can not be provided by a conventional electrooptic crystal prism can be obtained.

In embodiments 1 and 2, one electrode pair of a positive electrode and a negative electrode has been employed. However, a plurality of electrode pairs may be employed so long as a voltage by which a space-charge limited state is produced in the electrooptic crystal can be applied. One, or two or more alloys are selected from Ti, Pt, Au, Cu, Ag, Cr and Pd, and the electrode pairs are formed by the individual alloy structure, or by the alloy lamination structure.

Embodiment 3

Figure 20:
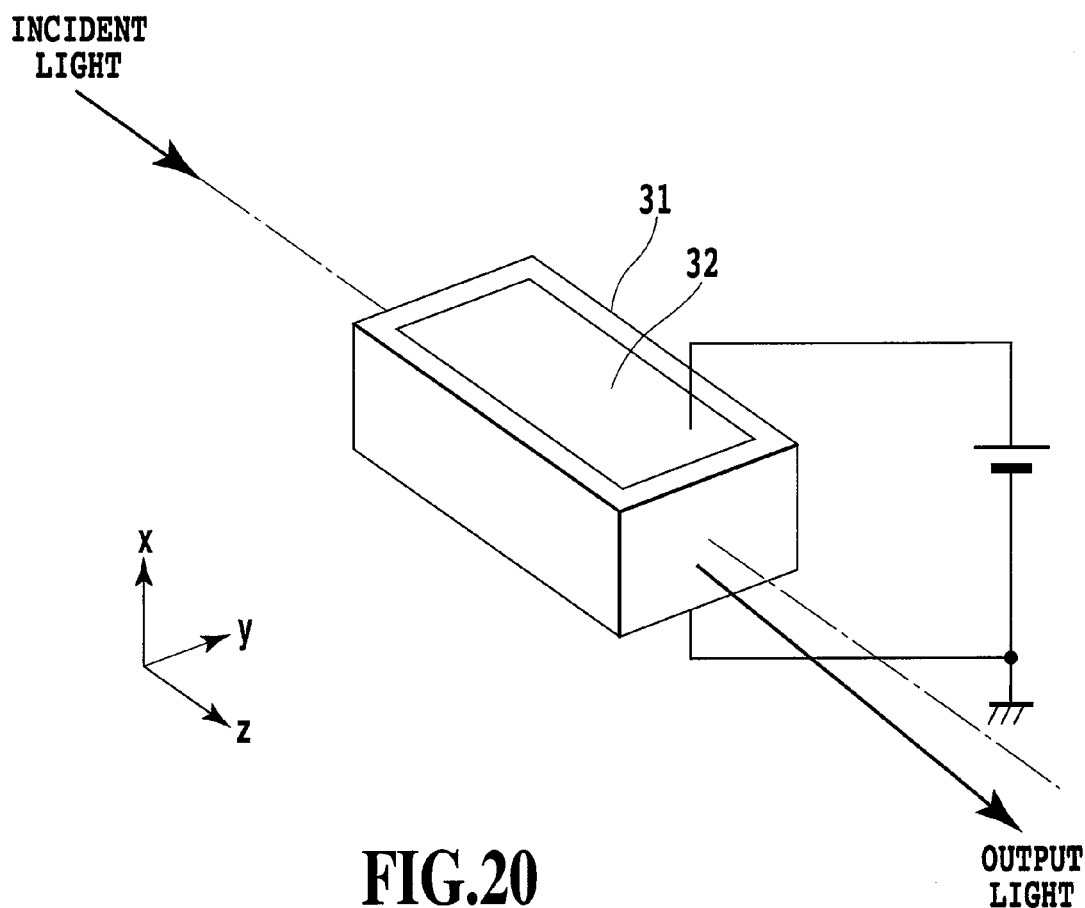
FIG. 20 is a diagram illustrating a light beam deflector according to embodiment 3 of the present invention.
Figure 21:
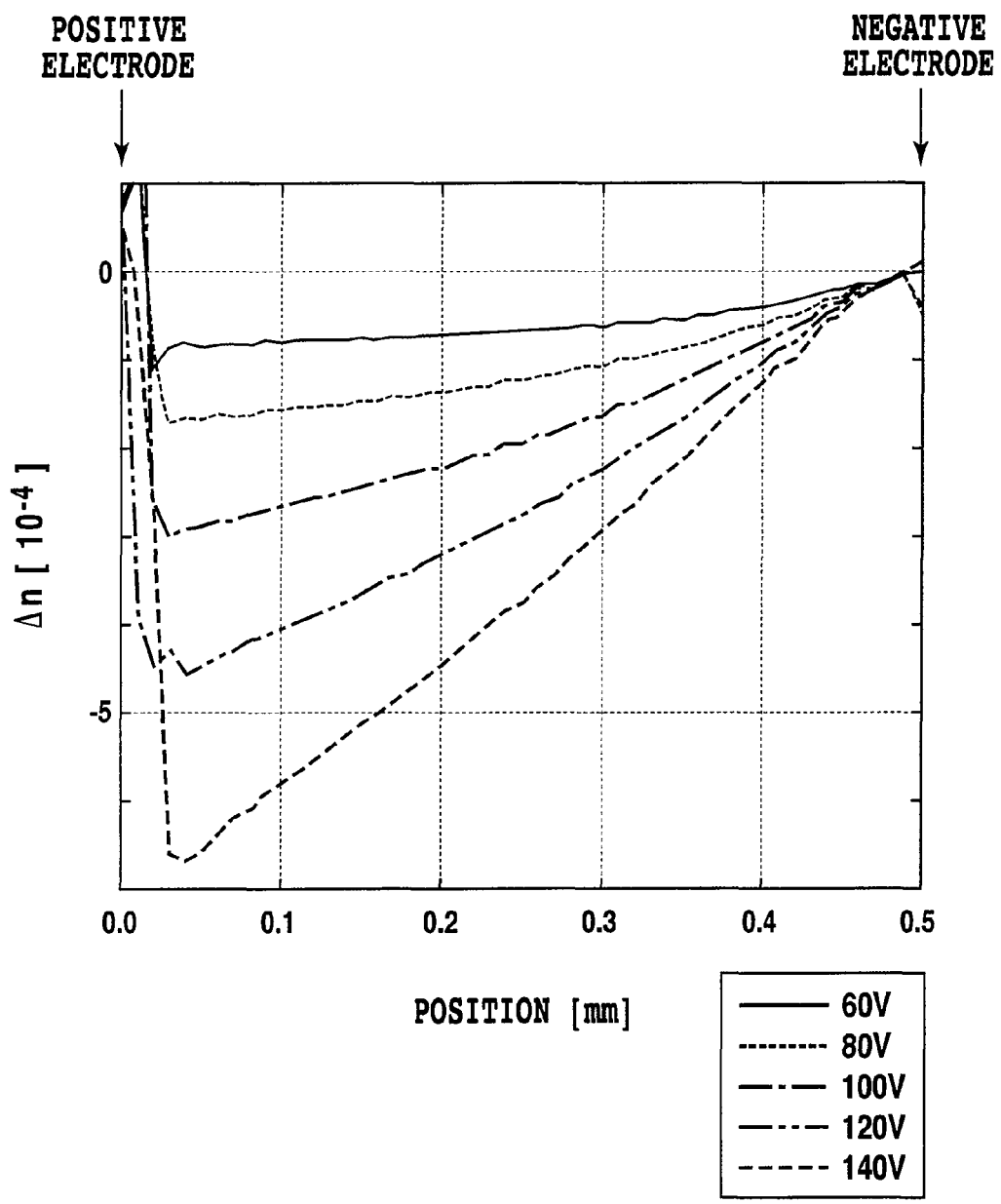
FIG. 21 is a graph showing a distribution of a change in the refractive index of the light beam deflector according to embodiment 3 of the present invention.

FIG. 20 shows a light beam deflector according to embodiment 3 of the present invention. For the light beam deflector, a positive electrode 32 and a negative electrode 33 are formed on opposite faces of a block electrooptic crystal 31. The electrooptic crystal 31, which is a KLTN crystal, is cut to a size 6 mm long (z axis)×5 mm wide (y axis)×0.5 mm thick (x axis), and electrodes 5 mm long×4 mm wide are attached to the opposite faces. The relative permittivity of the KLTN crystal for this embodiment is 6300 at the measurement temperature of 20° C. Ti/Pt/Au is employed as the electrode material. FIG. 21 shows a distribution of the refractive index change in the light beam deflector for the embodiment 3 of the present invention. A distribution is shown for the fluctuation, when a voltage applied between the positive and negative electrodes is changed, of a refractive index of light that vertically advances. The vertical axis represents the change in a refractive index when no voltage is applied, and the horizontal axis represents a distance from the positive electrode.

It is found that as the applied voltage is increased, the refractive index near the positive electrode is greatly changed, while the refractive index is nearly unchanged near the negative electrode. That is, it is found that the ideal ohmic contact ($x_0=0$) shown in FIGS. 8 and 9 is provided. At the time of the applied voltage of 140 V, the inclination of the refractive index is $1.5\times10^{-3}$ per 1 mm. Since the length of the electrode in the advancing direction of light is 5 mm, the light wave plane is inclined at a rate of $7.5\times10^{-3}$ mm for the thickness of 1 mm. Therefore, at the time of the applied voltage of 140 V, 7.5 mrad can be obtained as the deflection angle relative to the light axis of the incident light.

Embodiment 4

Figure 22:
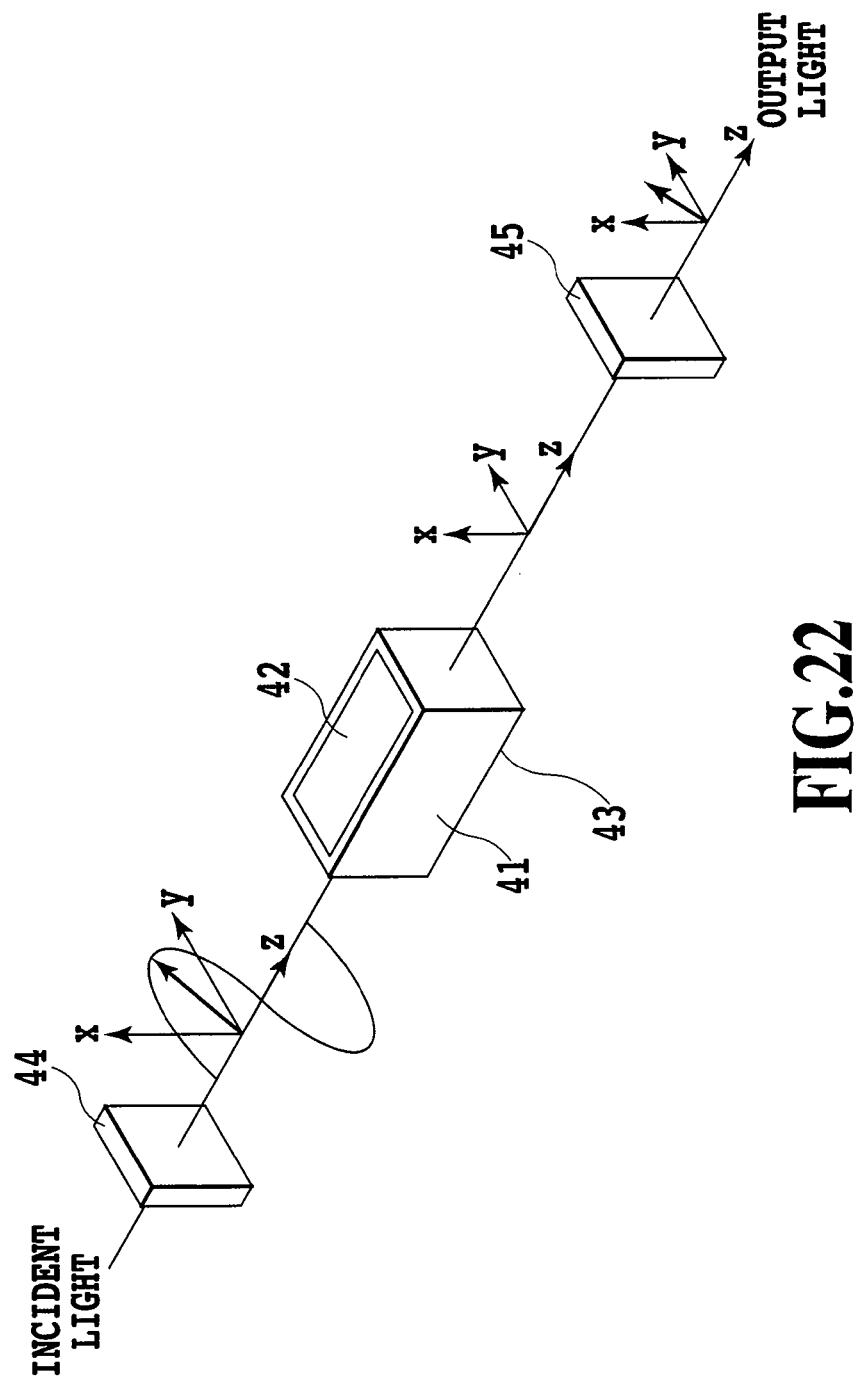
FIG. 22 is a diagram illustrating the structure of a light intensity modulator according to embodiment 4 of the present invention.

FIG. 22 shows the structure of a light intensity modulator according to embodiment 4 of the present invention. An electrode 42 and a negative electrode 43 are formed on opposite faces of an electrooptic crystal 41, and a deflector 44 is located on the incidence side of the electrooptic crystal 41, while an analyzer 45 is located on the emittance side. The electrooptic crystal 41 is a KLTN crystal (in $K_{1-y}Li_yTa_{1-x}Nb_xO_3$, x=0.40 and y=0.001). The positive electrode 42 and the negative electrode 43 made of Pt are formed on the upper face and the lower face of the electrooptic crystal 41. The size of the electrooptic crystal 41 is 6 mm long (z axis)×5 mm wide (y axis)×0.5 mm thick (x axis), and the positive electrode 42 and the negative electrode 43 are 5 mm long×4 mm wide.

The phase transition temperature of the KLTN crystal is 55° C., and the temperature of the electrooptic crystal 41 is set to 60° C. A He—Ne laser beam is employed as incident light. When a voltage of 58 V is applied between the positive and negative electrodes, the polarization direction of output light is rotated 90 degrees relative to the polarization direction of incident light. As the voltage applied between the positive electrode 42 and the negative electrode 43 is increased, turning on and off the output light is repeated, so that a light intensity modulator that has the operating characteristics shown in FIG. 3 can be obtained.

Embodiment 5

Focusing on expression (19) described above, in a case wherein the electrooptic device according to the mode of the present invention is employed as a beam deflection device, the deflection angle is proportional to the device length L of the electrooptic device. Therefore, in order to obtain a large deflection angle, the optical path of light passing inside the electrooptic device need only be extended.

Figure 23A:
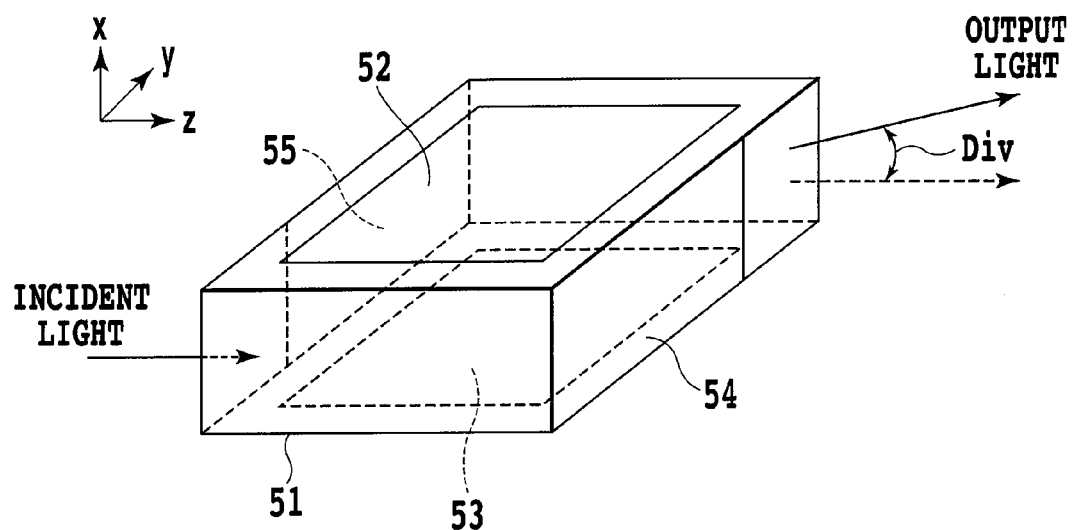
FIG. 23A is a diagram illustrating the structure of a beam deflector according to embodiment 5 of the present invention.

FIG. 23A shows the structure of a beam deflector according to embodiment 5 of the present invention. A KLTN crystal 51, such that x=about 0.40 and y=about 0.001 for $K_{1-y}Li_y Ta_{1-x}Nb_xO_3$, is grown and cut to the shape of a rectangle, and four faces are polished. A positive electrode 52 and a negative electrode 53 made of Ti/Pt/Au are formed on the upper face and the lower face of the KLTN crystal 51. The size of the KLTN crystal 51 is 6 mm long in the light propagation direction (z axis), 5 mm wide (y axis) and 0.5 mm thick (x axis). The electrodes, formed on the upper and lower faces of the KLTN crystal by vapor deposition, are 5 mm long in the light propagation direction.

Figure 23B:
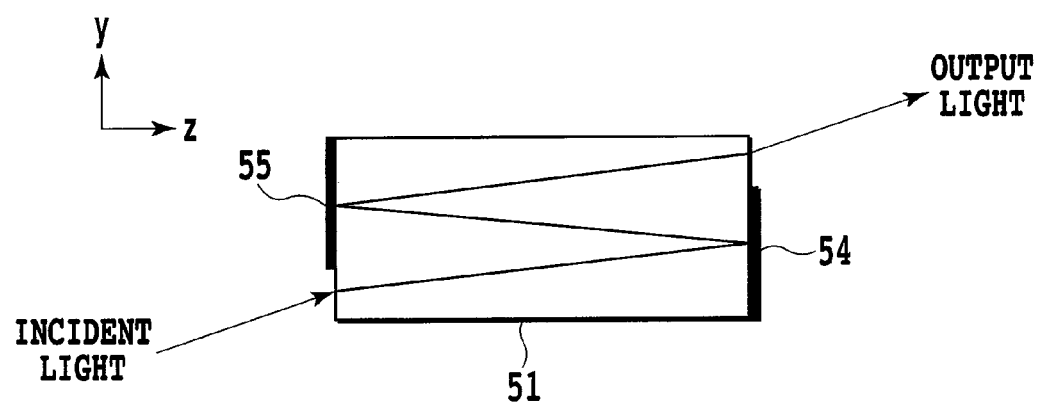
FIG. 23B is a diagram showing a beam propagation path for the beam deflector according to embodiment 5.

Furthermore, mirrors 54 and 55, made of a metal such as Au, or a dielectric multilayer film are deposited on the incidence face and the output face. Light emitted by a He—Ne laser enters, as incident light, the KLTN crystal 51. FIG. 23B shows a beam propagation path, viewed from the plane where the electrode 52 is formed. At this time, the angle in the direction horizontal to the incidence plane of the KLTN crystal 51 is adjusted, so that light passes through the inside of the crystal, reciprocally, 1.5 times, i.e., passes between the incidence plane and the output plane three times. As a result, the output light is obtained.

The KLTN crystal 51 is an electrooptic crystal having an electrooptic constant that is great near the phase transition from the cubic system to the tetragonal system. Since the phase transition temperature of the KLTN crystal 51 is 55° C., a Peltier device and a resistance bulb are employed to set the temperature of this device at 60° C., which is higher by about 5° C. than the phase transition temperature. Thus, the Kerr effect can be employed as the electrooptic effect for the KLTN crystal 51.

Figure 24:
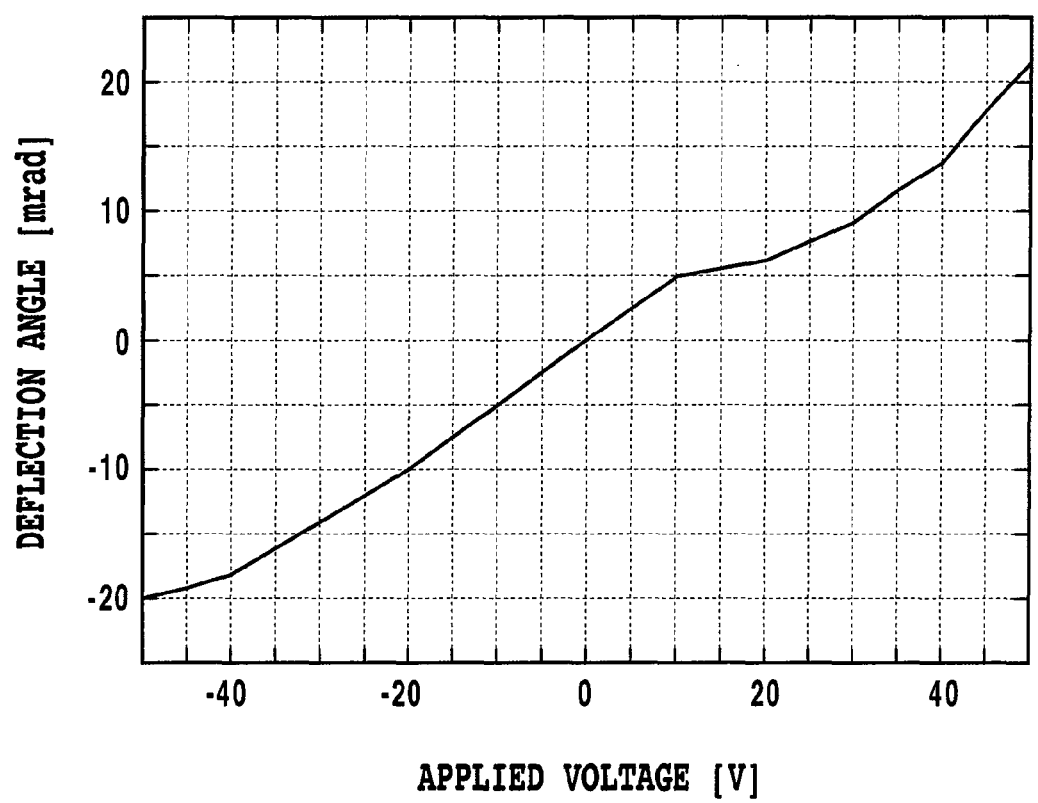
FIG. 24 is a graph showing a relationship between a voltage, applied by the beam deflector according to the embodiment 5, and a deflection angle.

FIG. 24 shows a relationship between the applied voltage of the beam deflector of embodiment 5 and the deflection angle. When a voltage of 50 V is applied (an electric field of 100 V/mm is applied) between the positive electrode 54 and the negative electrode 55, light is moved one time between the incidence plane and the emittance plane, and the deflection angle is about 7 mrad. Therefore, as shown in FIG. 23A, about 21 mrad is obtained as a deflection angle Div in the vertical direction (x axial direction) of output light.

Embodiment 6

Figure 25A:
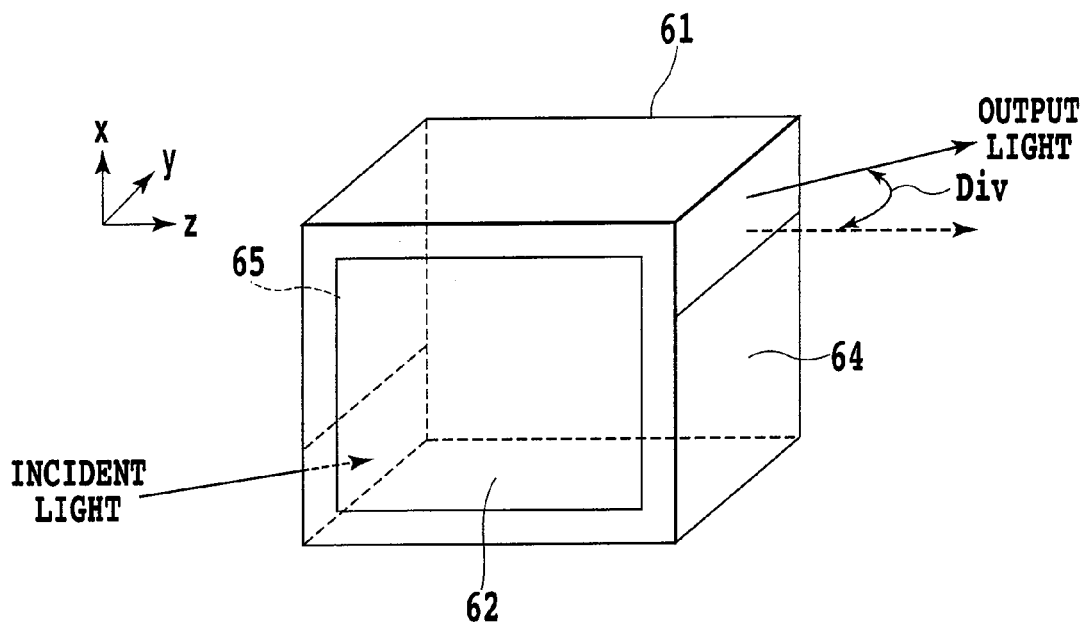
FIG. 25A is a diagram illustrating the structure of a beam deflector according to embodiment 6 of the present invention.

FIG. 25A shows the structure of a beam deflector according to embodiment 6 of the present invention. A KLTN crystal 61, such that x=about 0.40 and y=about 0.001 for $K_{1-y}Li_y Ta_{1-x}Nb_xO_3$, is grown and cut to the shape of a rectangle, and four faces are polished. A positive electrode 62 and a negative electrode 63 (not shown) made of Ti/Pt/Au are formed on the side faces of the KLTN crystal 61. The size of the KLTN crystal 61 is 6 mm long in the light propagation direction (z axis), 0.5 mm wide (y axis) and 5 mm thick (x axis). The electrodes, formed on the side faces of the KLTN crystal by vapor deposition, are 5 mm long in the light propagation direction.

Figure 25B:
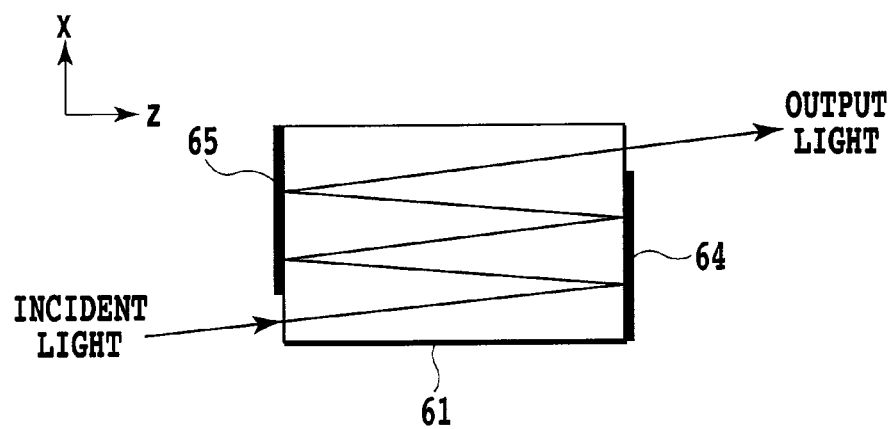
FIG. 25B is a diagram showing a beam propagation path for the beam deflector according to embodiment 6.

Furthermore, mirrors 64 and 65, made of a metal such as Au, or a dielectric multilayer film are deposited on the incidence face and the emittance face. Light emitted by a He—Ne laser enters, as incident light, the KLTN crystal 61. FIG. 25B shows a beam propagation path, viewed from the plane where the electrode 62 is formed. At this time, the angle in the direction perpendicular to the incidence plane of the KLTN crystal 61 is adjusted, so that light is output after passing through the inside the crystal, reciprocally, 2.5 times, i.e., passes between the incidence plane and the emittance plane five times.

The KLTN crystal 61 is an electrooptic crystal having an electrooptic constant that is great near the phase transition from the cubic system to the tetragonal system. Since the phase transition temperature of the KLTN crystal 20 is 55° C., a Peltier device and a resistance bulb are employed to set the temperature of this device at 60° C., which is higher by about 5° C. than the phase transition temperature. Thus, the Kerr effect can be employed as the electrooptic effect for the KLTN crystal 61.

When a voltage of 150 V is applied (an electric field of 200 V/mm is applied) between the positive electrode 62 and the negative electrode 63, light is moved one time between the incidence plane and the emittance plane, and the deflection angle is about 30 mrad. Therefore, about 150 mrad is obtained as a deflection angle 22 in the horizontal direction (y axial direction) of an output beam 21.

According to embodiment 5 and embodiment 6, since the optical path of light that passes inside the electrooptic device is extended, a drive voltage can be set to 1/n (n: passage count), compared with a case wherein, one time only, light passes through the inside the electrooptic device having the same device length. When the drive voltage is the same, the device length of the electrooptic device can be reduced to 1/n. As the device length is shorter, the capacitance element becomes smaller relative to the voltage to be applied, and the speed of the deflection operation can be increased. Furthermore, the quadratic electrooptic constant $s_{ij}$ is greater for a case $s_{11}$ wherein the light polarization direction is parallel to the applied electric field than for a case $s_{11}$ wherein the light polarization direction is perpendicular to the applied electric field. Therefore, when the number of times reciprocation is increased, a satisfactory deflection angle can be obtained.

It should be noted that mirrors may be provided by forming a metal or a dielectric multilayer film through vapor deposition or sputtering, or by using total reflection on the end face of the crystal.

Embodiment 7

Figure 26:
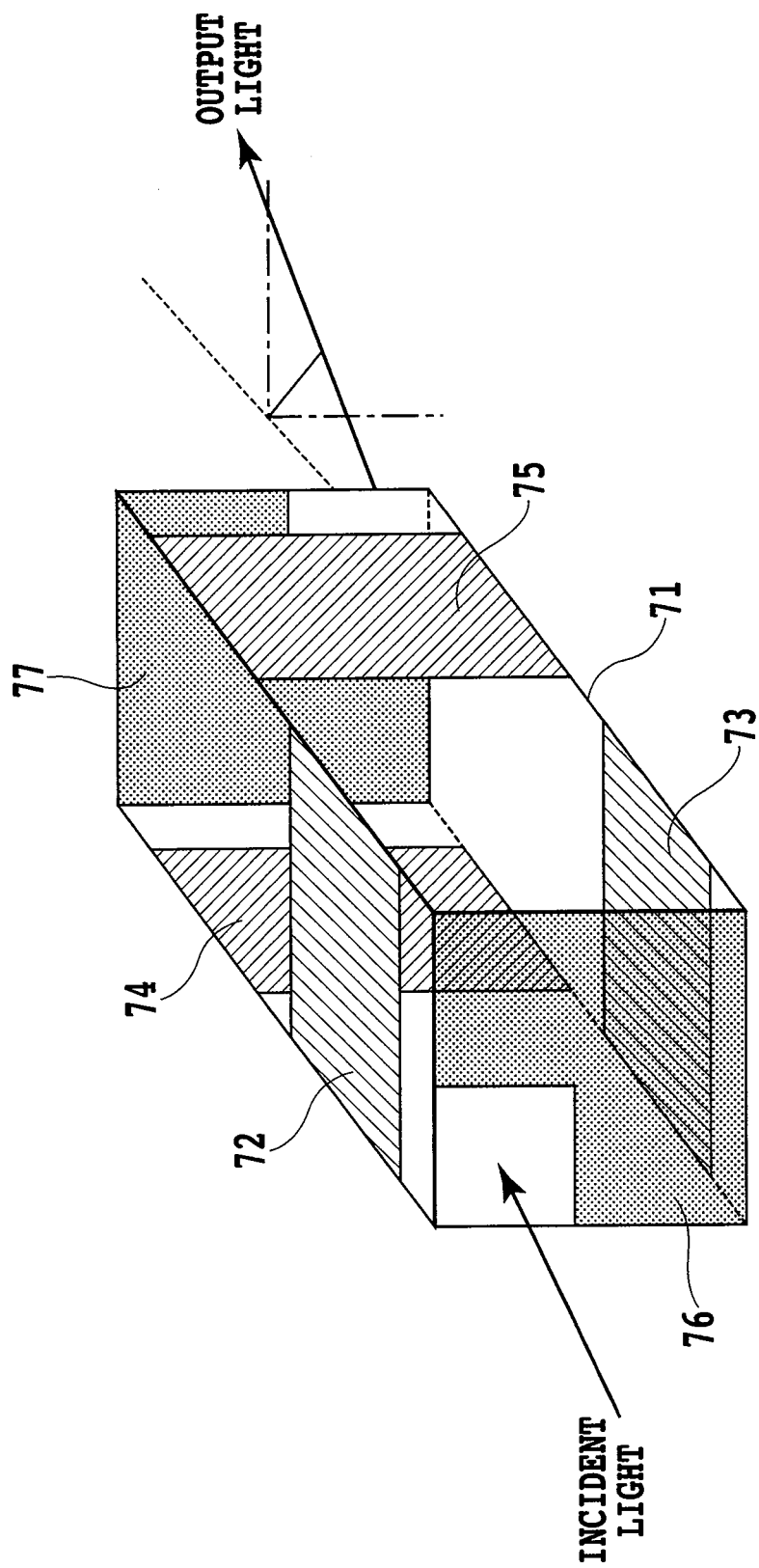
FIG. 26 is a diagram illustrating the structure of a beam deflector according to embodiment 7 of the present invention.

FIG. 26 shows the structure of a beam deflector according to embodiment 7 of the present invention. A KLTN crystal 71 such that x=about 0.40 and y=about 0.001, for $K_{1-y}Li_y Ta_{1-x}Nb_xO_3$, is grown and cut to the shape of a rectangle, and four faces are polished. A positive electrode 72 and a negative electrode 73 made of Ti/Pt/Au are formed on the upper face and the lower face of the KLTN crystal 71. The positive electrode 72 and the negative electrode 73 serve as vertical deflection electrodes.

Further, a positive electrode 74 and a negative electrode 75, which serve as horizontal deflection electrodes, are formed on the side faces of the KLTN crystal 71. Furthermore, mirrors 76 and 77 made of metal or a dielectric multilayer film are deposited on the incidence face and the emittance face.

Light emitted by a He—Ne laser enters, as incident light, the KLTN crystal 71. At this time, the angles in the directions horizontal and perpendicular to the incidence plane of the KLTN crystal 71 are adjusted, so that light is output after it has passed through the inside the crystal, reciprocally, 2.5 times, i.e., is passed between the incidence plane and the emittance plane five times. As a result, as well as in embodiment 5 and embodiment 6, the output light can be deflected horizontally and vertically.

Embodiment 8

Figure 27:
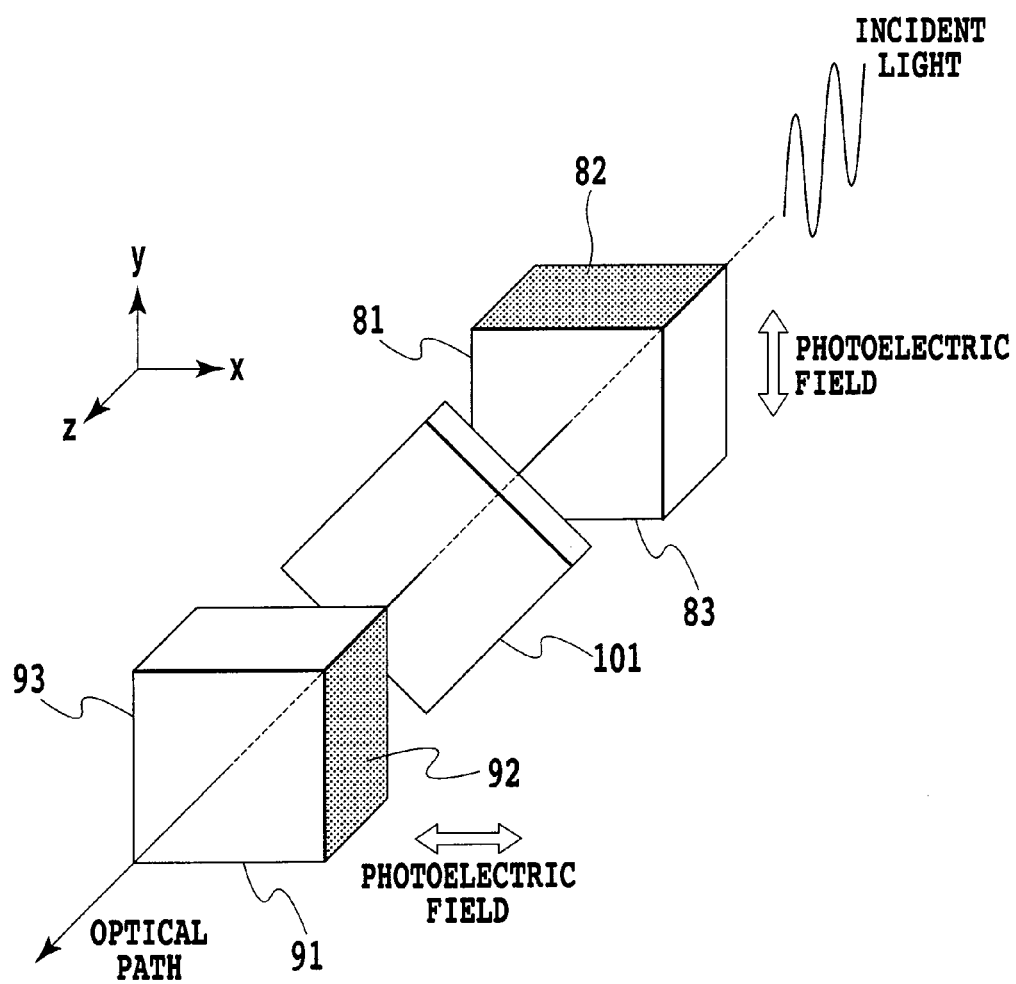
FIG. 27 is a diagram illustrating the structure of a two-dimensional beam deflector according to embodiment 8 of the present invention.

FIG. 27 shows a two-dimensional beam deflector according to embodiment 8 of the present invention. Electrooptic crystals having a size 6 mm long×5 mm wide×0.5 mm thick are cut from a KLTN crystal. Electrodes 5 mm long×4 mm wide are attached to opposite faces 82 and 83, and 92 and 93 of electrooptic crystals 81 and 91, respectively. The phase transition temperature of the KLTN crystal is 55° C., and the temperature of the electrooptic crystals 81 and 91 is set at 60° C. Cr is employed as the electrode material. The electrooptic crystals 81 and 91 are located on the optical path, so that the direction in which the electric field is to be applied to the electrooptic crystal 81 is at a right angle to the direction in which the electric field is to be applied to the electrooptic crystal 91. A half-wave plate 101, made of rock crystal, is inserted into the optical path between the electrooptic crystals 81 and 91, so that light output by the electrooptic crystal 81 is to be rotated 90 degrees and enter the electrooptic crystal 91.

As described above, the deflection efficiency depends on the field direction of light, and reaches the maximum when the field direction for light is parallel to the space field direction due to the applied voltage. Therefore, based on the polarization dependency, the tilt of the refractive index change is different between vertically polarized light and horizontally polarized light. According to the KLTN crystal, since $s_{11}$:$s_{12}$=about 10:−1 is the Kerr constant relative to vertically polarized light (the y axial direction in FIG. 27) and horizontally polarized light (the x axial direction in FIG. 27), only the output angle of vertically polarized light is greatly changed.

Thus, in the electrooptic crystal 81, light is deflected in the y axial direction by applying an electric field in parallel to vertically polarized light, and the deflected light is rotated 90 degrees by the half-wave plate 101. And in the electrooptic crystal 91, the resultant light is deflected in the x axial direction by applying an electric field that is parallel to horizontally polarized light. As a result, efficient two-dimensional deflection is enabled.

Embodiment 9

Figure 28:
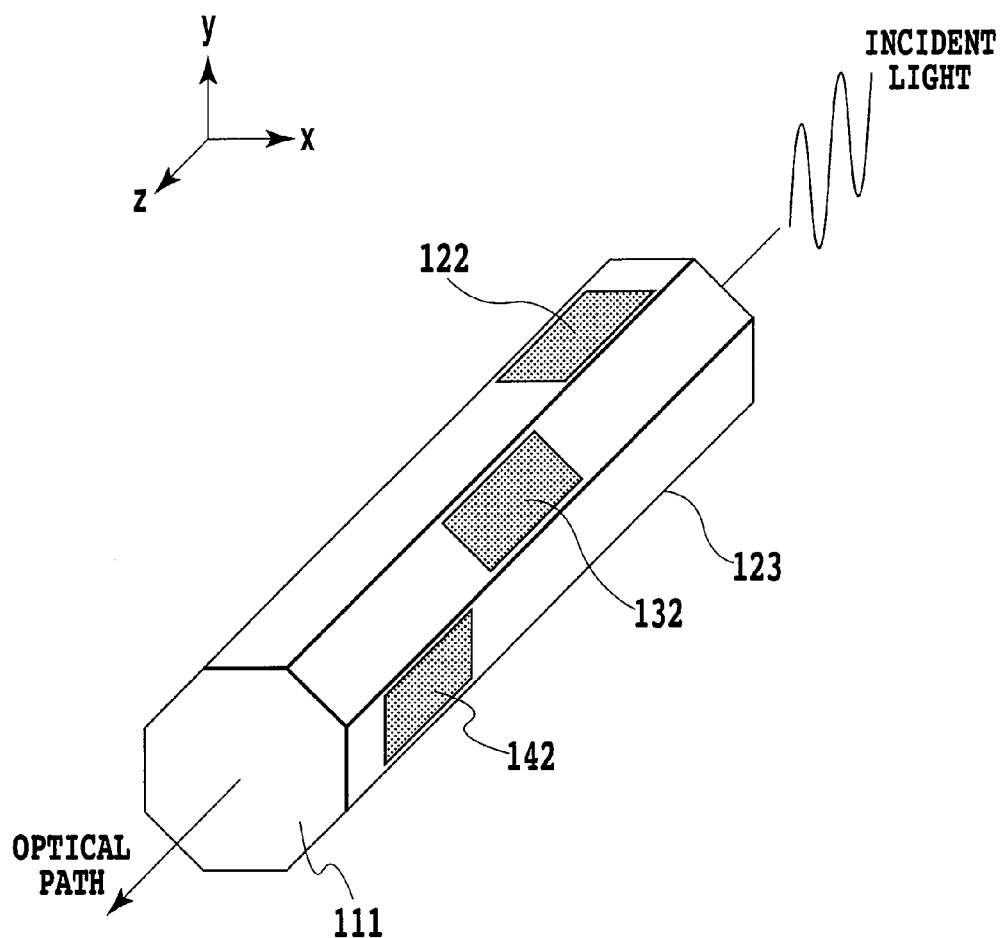
FIG. 28 is a diagram illustrating a two-dimensional beam deflector according to embodiment 9 of the present invention.

FIG. 28 shows the structure of a two-dimensional beam deflector according to embodiment 9 of the present invention. An electrooptic crystal, which is a KLTN crystal, is cut out to obtain a size 20 mm long×5 mm wide×5 mm thick, and is shaved to obtain an octagonal prism whose longitudinal cross section is an octagon. Three pairs of electrodes 5 mm long× 1.5 mm wide are attached to opposite faces of an electrooptic crystal 111. The phase transition temperature of the KLTN crystal is 55° C., and the temperature of the electrooptic crystal 111 is set at 60° C. As for the electrodes, beginning with the light incidence side, electrodes 122 and 123 for a first deflector, electrodes 132 and 133 for a half-wave plate and electrodes 142 and 143 for a second deflector are sequentially attached.

Here, Cr is employed as the electrode material for the electrodes 122 and 123 and the electrodes 142 and 143, and Pt is employed as the electrode material for the electrodes 132 and 133. For the deflector electrodes, the electron injection efficiency must be increased in order to improve the deflection efficiency, and an electrode material that will serve as an ohmic contact should be selected. On the other hand, for the electrodes for a half-wave plate, since simply the rotation of a polarized wave is required, no occurrence of deflection is preferable. Therefore, the electron injection efficiency must be reduced, and an electrode material that serves as a Schottky contact should be selected.

With this arrangement, as well as in embodiment 8, light is deflected by the first deflector in the y axial direction, and the deflected light is rotated 90 degrees by the half-wave plate. And the resultant light is deflected by the second deflector in the x axial direction. Since as described above a single KLTN crystal is employed to provide three functions, i.e., a vertical deflection function, a horizontal deflection function and a half-wave plate, a KLTN crystal for a cubic system is preferable.

Embodiment 10

Figure 29A:
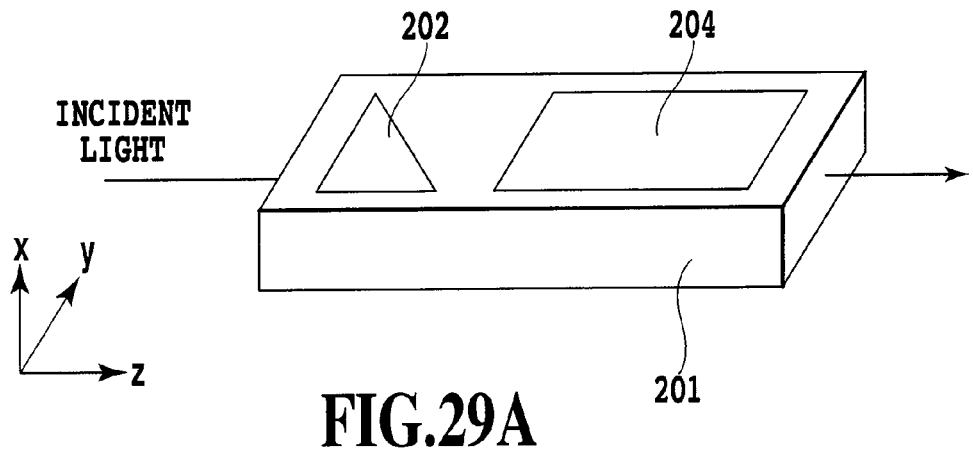
FIG. 29A is a perspective view of the structure of a two-dimensional beam deflector according to embodiment 10 of the present invention.
Figure 29B:
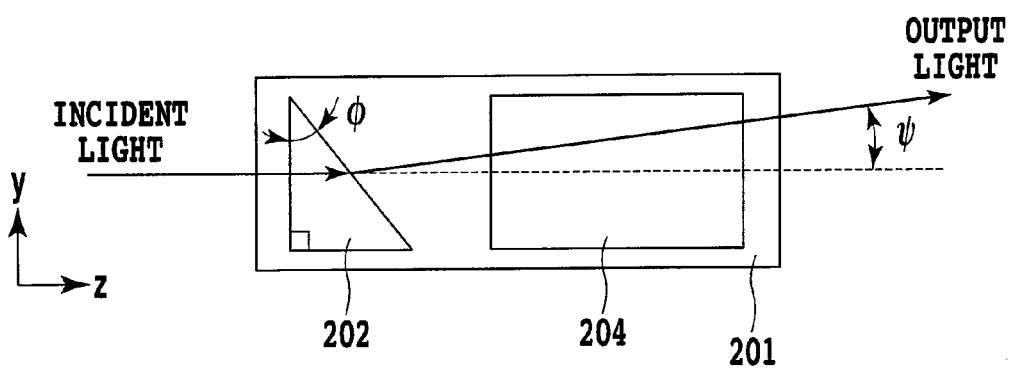
FIG. 29B is a top view of the structure of the two-dimensional beam deflector according to embodiment 10 of the present invention.
Figure 29C:
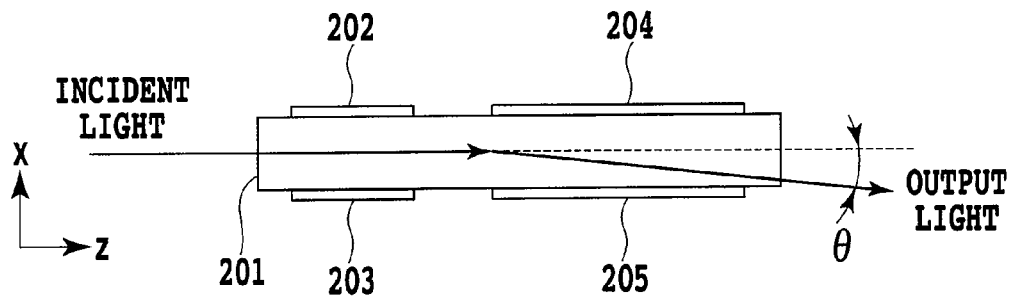
FIG. 29C is a side view of the structure of the two-dimensional beam deflector according to embodiment 10 of the present invention.

FIG. 29A shows the structure of a two-dimensional beam deflector according to embodiment 10 of the present invention. An electrooptic crystal 201, which is a KLTN crystal, is cut to obtain a size 10 mm long (z axis)×5 mm wide (y axis)×0.5 mm thick (x axis). Two pairs of electrodes are attached to opposite faces of the electrooptic crystal 201. Beginning from the light incidence side, electrodes 202 and 203 for a first deflector and electrodes 204 and 205 for a second deflector are attached. There is no problem in replacing this order. The phase transition temperature of the KLTN crystal is 55° C., and the temperature of the electrooptic crystal 201 is set at 60° C.

The electrodes 202 and 203 of the first deflector are shaped like right-angled triangles employing, as the base, the side near the incidence of light. One of the base angles is a right angle, the other base angle □ is 30 degrees, the length of the base is 4 mm, the height is 3 mm, and the length of the hypotenuse is 5 mm. For the electrodes 202 and 203 of the first deflector, an electrode material containing Pt is employed, so that a Schottky contact is obtained. The electrodes 204 and 205 for the second deflector are rectangular electrodes 5 mm long×4 mm wide. For the electrodes 204 and 205 of the second deflector, an electrode material containing Ti is employed, so that an ohmic contact is obtained.

Since, through the electrooptic effect provided by the KLTN crystal, the refractive index is uniformly changed in the portion in which the electrodes 202 and 203 for the first deflector are formed, this portion serves as a prism that acts on incident light. When n denotes the refractive index of the electrooptic crystal 201, $S_{ij}$ denotes an electrooptic constant, d denotes a thickness, V denotes an applied voltage, and □ denotes the base angle of one of the electrodes 202 and 203 for the first deflector, the deflection angle ψ is represented by

[Expression 17]

$$\psi = \frac{1}{2} n^3 S_{ij} \left(\frac{V}{d}\right)^2 \tan\phi \tag{20}$$

and light is deflected in the y axial direction.

As well as in embodiment 3, the ideal ohmic contact is provided in the portion wherein are located the electrodes 204 and 205 for the second deflector, and the charge injection efficiency is the maximum. Therefore, since output light is deflected in the x axial direction, efficient two-dimensional deflection is enabled.

Embodiment 11

At present, a three-axis lens actuator is employed for a servo mechanism employed for an optical recording/reproduction apparatus used for DVDs. The actuator employs a moving coil motor to drive a wire that holds an object lens. The Lorentz force that acts on charges that move through magnetic fluxes is employed as the driving principle of the moving coil motor. Since this actuator mechanism is a mechanically operated type, many inherent vibration modes are included. In a case wherein the actuator is driven at a frequency equal to the inherent vibrations, an inherent mode is driven and resonance occurs.

The lowest order resonance of the actuator can be avoided through the control exercised by a control system. However, it is difficult to avoid the affect by a higher-order resonance, and as a result, a high-order resonance is not stabilized by the control system, and accurate positioning is difficult. Therefore, the above described light beam deflector is employed to provide an optical pickup apparatus that comprises a servo mechanism that does not include a mechanically driven portion.

Figure 30:
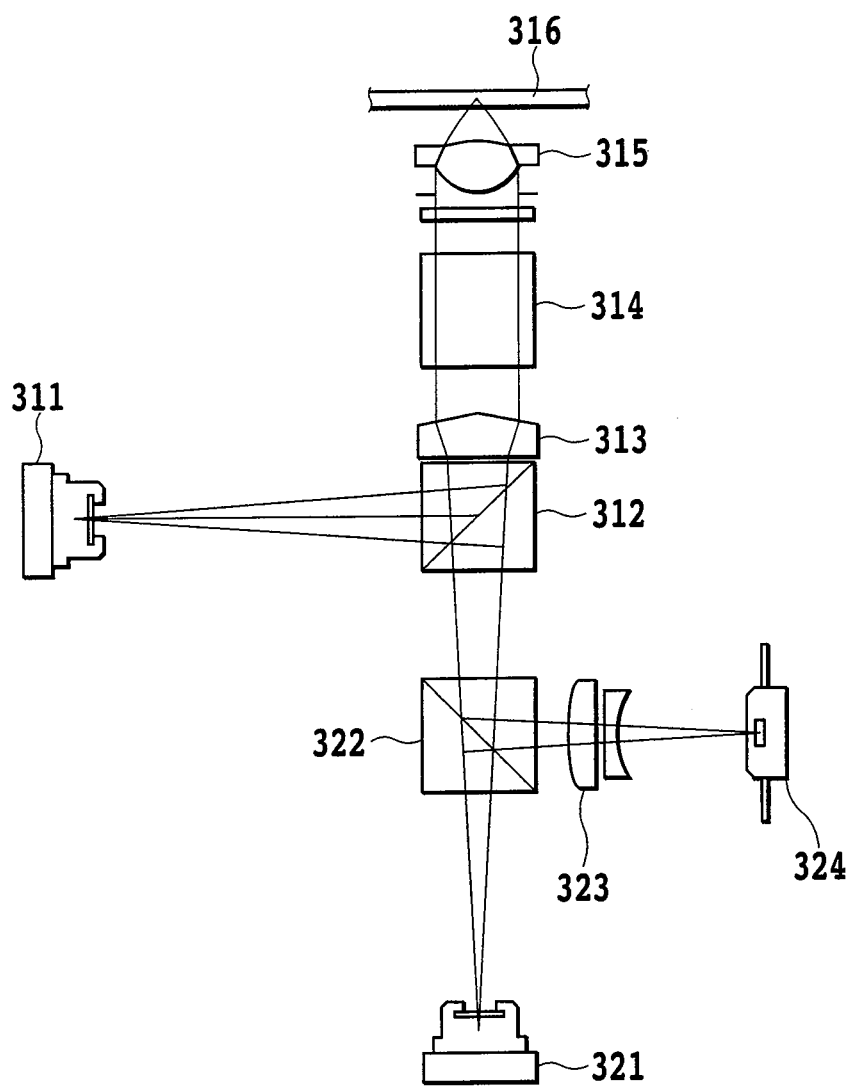
FIG. 30 is a diagram illustrating the structure of an optical pickup apparatus according to embodiment 11 of the present invention.

FIG. 30 shows the arrangement of an optical pickup apparatus according to embodiment 11 of the present invention. The optical pickup apparatus employs the light beam deflector shown in FIG. 20 for the embodiment 3, and recording media are DVDs and HD-DVDs. A light beam emitted by a DVD laser diode (LD) 311, which is a light source, is passed through a half mirror 312 and a collimating lens 313 and enters an optical deflection device 314. Based on a tracking signal reflected by a disk 316, a controller (not shown) provides feedback control for the deflection angle at the optical deflection device 314. The light beam output by the optical deflection device 314 is transmitted via an object lens 315 to irradiate the disk 316.

An optical signal reflected by the disk 316 passes through the half mirror 322 and a detection lens 323, and enters a photodiode (PD) 324. Further, an HD-DVD laser diode (LD) 321 is optically coupled with the half mirror 322.

As described above, according to the conventional method, an object lens is driven by an actuator. Since the optical deflection device of this mode does not include a moving portion, resonance due to the driving of the main body does not occur. On the other hand, since a material that provides the quadratic electrooptic effect is employed, the resonance phenomenon occurs in the device material due to an electrostriction effect. Since this phenomenon depends on the size and shape of the material, the occurrence of the phenomenon can be controlled by breaking the symmetry of the shape. In this mode, the band of the servo has been defined as 1 MHz, at which the stable operation can be satisfactorily performed and optical recording/reproduction of high quality enabled. Since a voltage at this time for driving the optical deflection device to deflect a light beam falls within the range of ±12 V, the optical deflection device can be driven at a voltage that is satisfactory for practical use.

Further, the optical deflection device has been located between the collimating lens 313 and the object lens 315. However, so long as the location is along the optical path between the light source and a recording medium, the optical deflection device may be arranged at other portions of the optical pickup apparatus to obtain the same effects. Furthermore, since the light transmission wavelength of the optical deflection device is within a range of from 400 nm to 4000 nm, the device can be applied for an optical pickup apparatus that employs a plurality of wavelengths of visible light.

The optical pickup apparatus that employs the light deflection device of this mode has a band wherein appropriate control can still be exercised for a case wherein recording and reproduction at a high density, such as a 1TB class, is performed. Therefore, when the apparatus is employed for an HD-DVD or Blu-ray that requires higher density recording, greater effects can be anticipated, and higher-density recording/reproduction can be provided.

Embodiment 12

For performing printing, a laser printer radiates a photosensitive member with a laser beam, attaches toner to the exposed portion, and transfers the toner to a recording sheet. At this time, it is required that a laser beam be repetitively deflected, at least in the direction of one axis. The above described technique for rotating a polygon mirror is employed as a light deflection technique. For an improvement in the printing speed of a printer, a higher-speed optical deflection technique is requested. Thus, the above described light beam deflector is employed to provide a fast laser printer.

Figure 31A:
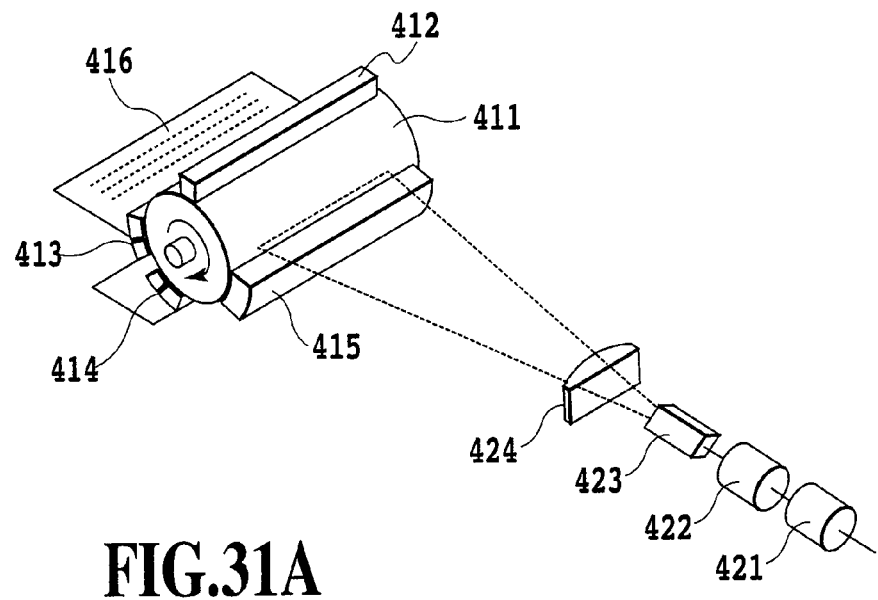
FIG. 31A is a diagram illustrating the structure of a laser printer according to embodiment 12 of the present invention.
Figure 31B:
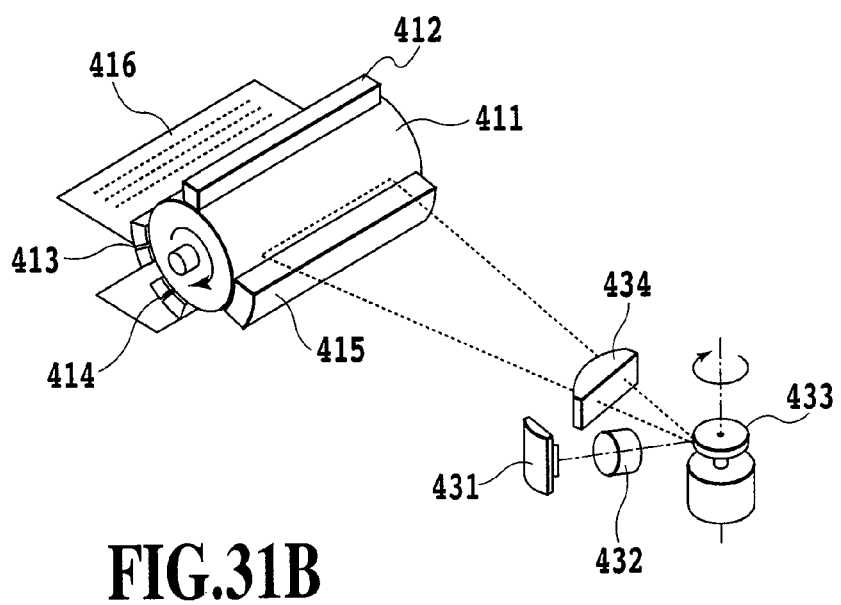
FIG. 31B is a diagram illustrating the structure of a conventional laser printer provided for a comparison.

FIG. 31A shows the structure of a laser printer according to the mode of the present invention. The illustrated laser printer employs the light beam deflector shown in FIG. 20 for embodiment 3. For comparison, a conventional laser printer is shown in FIG. 31B. In the laser printer, a charging unit 412, a developing unit 415, a transfer unit 414 and a fixing unit 413 are arranged around the periphery of a cylindrical photosensitive drum 411, which is a photosensitive member. The photosensitive drum 411 charged by the charging unit 412 is irradiated by a laser beam, and toner is attached to the exposed portion by the developing unit 415. Then, a toner image is transferred to a recording sheet 416 by the transfer unit 414, and is fixed by the fixing unit 413.

As shown in FIG. 31B, in a conventional laser printer, a laser beam emitted by a laser diode 431 is collimated by a collimating lens 432, and is reflected by a polygon mirror 433. The laser beam is deflected by rotating the polygon mirror 433, and the deflected beam is transmitted via a lens 434 to radiate a photosensitive member 411. As shown in FIG. 31A, in the laser printer of this mode, a laser beam emitted by a laser diode 421, which is a light source, is collimated by a collimating lens 422, and enters an optical deflection device 423. The laser beam deflected by the optical deflection device 423 is transmitted via a lens 424 to radiate the photosensitive member 411.

For the optical deflection device 423 located on the optical path extending between the laser diode 421 and the photosensitive member 411, four elements are employed in order to scan the entire photosensitive member 411 in the scanning direction. Since the power consumed by one element is equal to or lower than 1 mW, power consumption is reduced compared with the conventional laser printer. Further, since the chip size of the optical deflection device is so small that it can be integrated with a laser diode, downsizing is enabled, unlike the polygon mirror.

The optical deflection speed of the optical deflection device 423 is 1 MHz, and the maximum rotation frequency of the polygon mirror 433 is 10 kHz (60000 rpm). Assuming that the polygon mirror 433 has ten mirror planes, the laser printer for this mode can provide ten times the speed. For example, a conventional fast laser printer that employs a plurality of laser beams has a printing capability of about 40 sheets per minute, while the laser printer of this embodiment can obtain a printing capability of about 300 sheets per minute.

Furthermore, two optical deflection devices, the field directions of which intersect each other, are located and a half-wave plate is arranged between the two optical deflection devices. When the two optical deflection devices are controlled separately, two-dimensional scanning by a laser beam can be performed. Since the speed of the exposing of the photosensitive member can be remarkably increased through two-dimensional scanning, a printing capability of about 500 sheets per minute can be obtained. Further, when one more optical deflection device is located between the optical deflection devices and the laser diode, and when light is deflected outside the optical path used for exposure by a laser beam, a light ON/OFF function can be additionally provided.

What is claimed is:

1. A beam deflector comprising:
   an electrooptic crystal having an electrooptic effect;
   an electrode pair of a positive electrode and a negative electrode for generating an electric field inside the electrooptic crystal, which are formed opposite each other on parallel faces of the electrooptic crystal, wherein said electrode pair are formed of a material that serves as an ohmic contact for a carrier that contributes to electrical conduction of the electrooptic crystal; and
   mirror faces formed on an incidence plane and an emittance plane of light that enters perpendicular to the direction of the electric field;
   wherein an incident light axis is set perpendicular to the direction of the electric field, and
   wherein when a voltage is applied to the electrode pair:
   the carrier is injected into the electrooptic crystal and a space charge is generated inside the electrooptic crystal,
   the relationship between voltage and current is outside Ohm's law due to the space charge,
   a space-charge limited state is generated inside the electrooptic crystal in which current non-linearly increases relative to voltage,
   the electric field is terminated by the space charge, and
   a controllable tilt is generated in the electric field distribution,
   such that a tilt is generated in the change of the refractive index in the electrooptic crystal.

2. The beam deflector according to claim 1, wherein a relative permittivity of the electrooptic crystal is 500 or higher to 40000 or lower.

3. The beam deflector according to claim 2, wherein the electrooptic crystal is one of $K_{1-y}Li_yTa_{1-x}Nb_xO_3$ ($0<x<1$, $0<y<1$), $Ba_{1-x}Sr_xTiO_3$ ($0<x<1$), $Sr_{0.75}Ba_{0.25}Nb_2O_6$ and $Pb_{1-y}La_yTi_{1-x}Zr_xO_3$ ($0<x<1$, $0<y<1$).

4. The beam deflector according to claim 1, wherein the mirror faces are parallel to each other.

5. The beam deflector according to claim 1, wherein the amount of tilt in the electric field distribution is controlled by the voltage applied to the electrode pair.

* * * * *